(12) United States Patent
Brayer

(10) Patent No.: US 11,528,884 B2
(45) Date of Patent: Dec. 20, 2022

(54) DAIRY FARM WITH A SINGLE OR MULTIPLE FRONTAL ELEVATED ROADS

(71) Applicant: DAIRYCS AUTOMATIC MILKING LTD, Rosh Haayin (IL)

(72) Inventor: Eyal Brayer, Kfar Monash (IL)

(73) Assignee: DAIRYCS AUTOMATIC MILKING LTD., Rosh Haayin (IL)

( * ) Notice: Subject to any disclaimer, the term of this patent is extended or adjusted under 35 U.S.C. 154(b) by 0 days.

(21) Appl. No.: 17/635,107

(22) PCT Filed: Aug. 27, 2020

(86) PCT No.: PCT/IL2020/050934
§ 371 (c)(1),
(2) Date: Feb. 14, 2022

(87) PCT Pub. No.: WO2021/038566
PCT Pub. Date: Mar. 4, 2021

(65) Prior Publication Data
US 2022/0264841 A1    Aug. 25, 2022

(30) Foreign Application Priority Data

Aug. 28, 2019 (IL) .......................... 268978
Dec. 10, 2019 (IL) .......................... 271314
May 21, 2020 (IL) .......................... 274851

(51) Int. Cl.
*A01K 1/12*        (2006.01)
*A01J 5/003*       (2006.01)
(Continued)

(52) U.S. Cl.
CPC ................. *A01K 1/12* (2013.01); *A01J 5/003* (2013.01); *A01K 1/0005* (2013.01); *A01K 1/0047* (2013.01); *A01K 5/0266* (2013.01)

(58) Field of Classification Search
CPC ........ A01K 1/00; A01K 1/0017; A01K 1/126; A01K 1/12; A01K 1/0005; A01K 5/0266; A01J 5/003; A01J 5/007
(Continued)

(56) References Cited

U.S. PATENT DOCUMENTS 7,484,474 B2 * 2/2009 Van Den Berg ........ A01J 5/017
                                                    119/14.02
10,796,142 B2 * 10/2020 Psota ..................... G06T 7/246
(Continued)

FOREIGN PATENT DOCUMENTS

EP    1336337 A2    8/2003
EP    1576876 A3    9/2005
(Continued)

OTHER PUBLICATIONS

PCT International Search Report for International Application No. PCT/IL2020/050934, dated Dec. 14, 2020, 10pp.
(Continued)

*Primary Examiner* — Yvonne R Abbott-Lewis
(74) *Attorney, Agent, or Firm* — The Roy Gross Law Firm, LLC; Roy Gross

(57) ABSTRACT

The present invention discloses, inter alia, a free dome range system (FDR) comprising at least one front elevated rail (FER); at least one rear elevated rail (RER); a plurality of mobile units, each of the plurality of mobile units movable along a member of a group consisting of: the at least one FER, the least one RER and any combination thereof. The invention also discloses a method of positioning at least one of a plurality of mobile units in an FDR comprising steps of providing a free dome range system (FDR) comprising at least one front elevated rail (FER); at least one rear elevated rail (RER); and the plurality of mobile units, each of the plurality of mobile units movable along a member of a group
(Continued)

consisting of: the at least one FER, the least one RER and any combination thereof. The present invention further discloses a dairy farm characterized by (a) an array of n stalls side-by-side along an X axis on the dairy animal's level. Each of the stalls is configured by means of size and shape to accommodate a dairy animal, having a main axis Y that is substantially perpendicular to axis X, a front side and an opposite rear side; and (b) a common elevated road surface provided on a higher level, above the stalls. This upper road surface extends along the X axis and is constructed to allow free passage of mobile units, including mobile longitudinal milking units, in a direction along the X axis, along the Y axis, a rotation about the X axis, a rotation about the Y axis, a rotation about the Z axis, and any combination thereof. The present invention further discloses means and method that in a stall, a gate located between the animal and the feeding line is thereby configured to at least temporarily prevent or otherwise limit free access of said animal to its feed.

20 Claims, 15 Drawing Sheets

(51) Int. Cl.
*A01K 1/00* (2006.01)
*A01K 5/02* (2006.01)

(58) Field of Classification Search
USPC .................................................. 119/14.03
See application file for complete search history.

(56) References Cited

U.S. PATENT DOCUMENTS

| | | |
|---|---|---|
| 2002/0124802 A1 | 9/2002 | van der Lely et al. |
| 2014/0331934 A1* | 11/2014 | Eriksson ............... A01K 1/12 |
| | | 119/14.04 |
| 2018/0310517 A1 | 11/2018 | Van Den Berg |
| 2019/0223406 A1* | 7/2019 | Brayer ............... A01K 1/12 |

FOREIGN PATENT DOCUMENTS

| | | |
|---|---|---|
| WO | 9625846 A1 | 8/1996 |
| WO | 9801022 A1 | 1/1998 |
| WO | 2017051418 A2 | 3/2017 |

OTHER PUBLICATIONS

PCT Written Opinion for International Application No. PCT/IL2020/050934, dated Dec. 14, 2020, 4pp.

* cited by examiner

DAIRY FARM WITH A SINGLE OR MULTIPLE FRONTAL ELEVATED ROADS

CROSS REFERENCE TO RELATED APPLICATIONS

This application is a National Phase of PCT Patent Application No. PCT/IL2020/050934, having International filing date of Aug. 27, 2020 which claims the benefit of priority of Israeli Patent Application No. 268978, filed Aug. 28, 2019, Israeli Patent Application No. 271314, filed Dec. 10, 2019, and Israeli Patent Application No. 274851, filed May 21, 2020, the contents of which are all incorporated herein by reference in their entirety.

FIELD OF THE INVENTION

The present invention generally pertains to a free dome range (FDR) dairy farm comprising one or more elevated roads or rails system located above the front portion of an animal's stall, along which mobile units can be automatically moved. The present invention also pertains to a dairy farm with an upper road surface for free transport of mobile units. The present invention further pertains to means and methods to provide and operating a gate affixed in a stall. The gate is configured for limiting the access of a dairy animal, such as dried cows, to its feed.

BACKGROUND OF THE INVENTION

A free dome range (FDR) where dairy animals have free access to their stall to concurrently eat and to be milked was initially presented by the current inventors (WO2018008026). This FDR comprises, infer alia, mobile milking units (MMUs) configured to be transported on an elevated rail system to an animal, such as a cow, to its stall; and to milk the animal while it is eating. In some embodiments, the elevated rail system with its associated MMUs passes along the front portion of the stall (front elevated rail system). In a few embodiments, the elevated rail system with its associated MMUs passes along the rear portion of the stall.

An FDR comprising a front elevated rail system along which mobile units can be automatically moved is still a long-felt need.

Mobile milking units (MMUs) are known in the art, see U.S. Pat. No. 4,047,500, CN203226118U, EP1882410, RU2226822C, RU2233079C, RU2466533C, DE9305052U1, U.S. Pat. No. 4,034,711, RU2538384C, and GB665753. The prior-art MMUs are movable in the dairy farm on the ground, at the level of the dairy animal's legs.

Each dairy cow can produce about 65 lb of manure and 3.5 gallons of urine every day. Manure-based zoonotic bacteria, including *Salmonella* spp., *Campylobacter* spp., *Listeria monocytogenes, Yersinia enterocolitica, Escherichia coli* and protozoa viz. *Cryptosporidium parvum* and *Giardia lamblia* therefore contaminate the ground and equipment movable thereon.

Moreover, farm yards are full of various mechanical obstacles and constructions, as well as dairy animals, so transport of MMUs at or near ground level in such an environment is difficult and dangerous.

It is hence a long felt need to provide dairy farms with an easy, clean and safe means for transporting MMUs from animal to animal.

A rear gate in a stall ion known in the art. U.S. Pat. Nos. 1,009,714, 2,601,845, 3,166,044, 3,167,053, and 4,171,684 hence disclose a rear gate, for controllably limiting the accesses and exit of an animal to and from its stall. U.S. Pat. No. 4,171,684 discloses a hemispherical shape which generally conforms to the position of the animal's lower jaw when ingesting its food, aimed to permit the animal to eat in relative isolation and without the eye distraction caused by being able to see animals outside the stall.

It was disclosed by Clark et al. that to attain greatest milk yield a cow should be given a 50 to 60-day dry period. This allows the mammary gland to involute and prepare for subsequent lactation. Proper feeding of the dairy cow is essential during the dry period for best performance. Maximum dry matter intake and milk production can be obtained if cows are fed during the dry period so that they are in good body condition without becoming excessively fat. Conditioning of the cow for the next lactation should start near the end of the lactation because the overall efficiency of converting metabolizable energy of feed to body tissue is more efficient for lactating cows than for non-lactating cows; see Clark, Jimmy H., and Carl L. Davis. "Some aspects of feeding high producing dairy cows." Journal of Dairy Science 63.6 (1980): 873-885, incorporated herein as a reference.

Thus, as rear gates disclosed in the art are not provided useful, it is a long felt need to have and use a frontal feeding-type gate, thereby to at least temporarily prevent or otherwise limit free access of a dried animal staying in its stall to its feed.

SUMMARY OF THE INVENTION

It is an object of the present invention to disclose a free dome range system (FDR) comprising at least one front elevated rail (FER); at least one rear elevated rail (RER); a plurality of mobile units, each of the plurality of mobile units movable along a member of a group consisting of: the at least one FER, the least one RER and any combination thereof; The FDR may also comprises a controller comprising artificial intelligence (AI), the controller configured to control movement of each of the plurality of mobile units. The controller is configured to position at least one of the pluralities of mobile units at at least one predetermined location. The controller is also configured to control the movement of the plurality of mobile units either independently or as part of an interrelated system of operations.

It is another object of the present invention to disclose the FDR as defined above, wherein the FDR comprises a plurality of FERs, and/or a plurality of RERs.

It is another object of the present invention to disclose the FDR as defined in any of the above, wherein FER is located at a front portion of at least one cow stall; wherein the RER is located at a rear portion of at least one cow stall; and/or wherein a member of a group consisting of the FER, the at least one RER and any combination thereof is configured to be perpendicular to a line of stalls.

It is another object of the present invention to disclose the FDR as defined in any of the above, wherein at least one mobile unit is movable manually, semi-automatically, automatically, robotically, by means of an AI-activated computer system and any combination thereof.

It is another object of the present invention to disclose the FDR as defined in any of the above, wherein the at least one mobile unit is reversibly separable from a cow milking system.

It is another object of the present invention to disclose the FDR as defined in any of the above, wherein at least one mobile unit is selected from a group consisting of a taxi, a mobile milking unit (MMU); a mobile feeding unit (MFU); a mobile cooling unit (MCU); a mobile milk-transferring unit (MTU); a stall cleaning unit, an animal cleaning unit, an animal measuring unit, an animal identifying unit, a tag-free identification unit, an animal health-scoring unit, an animal body scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally or alternatively, the animal identifying unit is configured to provide a member of a group consisting of face recognition, biometric identification, authentication, authorization, verification and any combination thereof. Additionally, or alternatively, tag-free identification unit is configured to provide a member of a group consisting of face recognition, biometric identification, authentication and any combination thereof. Additionally or alternatively, an animal body scoring unit and/or the animal documenting unit is/are configured to provide a member of a group consisting of visible and NIR camera photographing or videoing, voice recording, temperature sensing, breath chemical analysis, biological analysis, physical analysis and any combination thereof. Additionally or alternatively, the animal feed analysis unit is configured to provide a member of a group consisting of analysis of grazing time, feed intake volume and/or rate, chewing rate, grazing patterns, eating patterns, rumination patterns and any combination thereof. Additionally or alternatively, the cow health unit is configured to provide a member of a group consisting of analysis of general health parameters, specific health parameters and any combination thereof. Additionally or alternatively, the cow health unit is configured to provide a member of a group consisting of analysis of eye health, nose health, food intake, estrus diagnosis and any combination thereof. Additionally or alternatively, the taxi is configured to reversibly and temporarily connect to a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally or alternatively, the taxi is configured to move a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof.

It is another object of the present invention to disclose the FDR as defined in any of the above, wherein at least one of the plurality of mobile units is movable independently of movement of all other of the plurality of mobile unit; and/or wherein movement of at least one of the plurality of mobile units is interrelated with movement of at least one other of the plurality of mobile units.

It is another object of the present invention to disclose, in a free dome range system (FDR), a front elevated rail (FER) along which at least one mobile unit is movable. Additionally or alternatively, the FER is located at a front portion of at least one cow stall. Additionally or alternatively, the FDR comprises a plurality of FERs. Additionally or alternatively, the FDR additionally comprising at least one rear elevated rail (RER). Additionally or alternatively, the RER is located at a rear portion of at least one cow stall. Additionally or alternatively, the at least one mobile unit is movable along the at least one RER. Additionally or alternatively, a member of a group consisting of the FER, the at least one RER and any combination thereof is configured to be perpendicular to a line of stalls. Additionally or alternatively, the at least one mobile unit is movable manually, semi-automatically, automatically, robotically, by means of an AI-activated computer system and any combination thereof. Additionally or alternatively, at least one mobile unit is reversibly separable from a cow milking system. Additionally or alternatively, the at least one mobile unit is selected from a group consisting of a taxi, a mobile milking unit (MMU); a mobile feeding unit (MFU); a mobile cooling unit (MCU); a mobile milk-transferring unit (MTU); a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally or alternatively, the animal identifying unit is configured to provide a member of a group consisting of face recognition, biometric identification, authentication, authorization, verification and any combination thereof. Additionally or alternatively, the tag-free identification unit is configured to provide a member of a group consisting of face recognition, biometric identification, authentication and any combination thereof. Additionally or alternatively, the animal documenting unit is configured to provide a member of a group consisting of visible and NIR camera photographing or videoing, voice recording, temperature sensing, breath chemical analysis, biological analysis, physical analysis, cow behavior, and any combination thereof. Additionally or alternatively, the animal feed analysis unit is configured to provide a member of a group consisting of analysis of grazing time, feed intake volume and/or rate, chewing rate, grazing patterns, eating patterns, rumination patterns and any combination thereof. Additionally or alternatively, the cow health unit is configured to provide a member of a group consisting of analysis of general health parameters, specific health parameters and any combination thereof. Additionally or alternatively, the cow health unit is configured to provide a member of a group consisting of analysis of eye health, nose health, food intake, estrus diagnosis and any combination thereof. Additionally or alternatively, the taxi is configured to reversibly and temporarily connect to a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally or alternatively, the taxi is configured to move a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally or alternatively, the FDR additionally comprising a plurality of mobile units. Additionally or alternatively, movement of at least one of the plurality of mobile units is independent of movement of all others of the plurality of mobile units. Additionally, or alternatively, movement of at least one of the plurality of mobile units is interrelated with movement of at least one other of the plurality of mobile units.

It is another object of the present invention to disclose the FDR as defined in any of the above, wherein mobile unit movable along at least one front elevated rail (FER). Additionally or alternatively, FER is located at a front portion of at least one cow stall. Additionally or alternatively, the mobile unit is movable along at least one rear elevated rail (RER). Additionally or alternatively, the FER is located at a rear portion of at least one cow stall. Additionally or alternatively, a member of a group consisting of the FER, the RER and any combination thereof is configured to be perpendicular to a line of stalls. Additionally or alternatively, the at least one mobile unit is movable manually, semi-automatically, automatically, robotically, by means of an AI-activated computer system and any combination thereof. Additionally or alternatively, the at least one mobile unit is reversibly separable from a cow milking system. Additionally or alternatively, the mobile unit is selected from a group consisting of a taxi, a mobile milking unit (MMU); a mobile feeding unit (MFU); a mobile cooling unit (MCU); a mobile milk-transferring unit (MTU); a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally or alternatively, the animal identifying unit is configured to provide a member of a group consisting of face recognition, biometric identification, authentication, authorization, verification and any combination thereof. Additionally or alternatively, the tag-free identification unit is configured to provide a member of a group consisting of face recognition, biometric identification, authentication and any combination thereof. Additionally or alternatively, animal documenting unit is configured to provide a member of a group consisting of visible and NIR camera photographing or videoing, voice recording, temperature sensing, chemical analysis, biological analysis, physical analysis and any combination thereof. Additionally or alternatively, the animal feed analysis unit is configured to provide a member of a group consisting of analysis of grazing time, feed intake volume and/or rate, chewing rate, grazing patterns, eating patterns, rumination patterns and any combination thereof. Additionally or alternatively, the cow health unit is configured to provide a member of a group consisting of analysis of general health parameters, specific health parameters and any combination thereof. Additionally or alternatively, the cow health unit is configured to provide a member of a group consisting of analysis of eye health, nose health, food intake, estrus diagnosis and any combination thereof. Additionally or alternatively, the taxi is configured to reversibly and temporarily connect to a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally or alternatively, the taxi is configured to move a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally or alternatively, the FDR additionally comprising a plurality of mobile units. Additionally or alternatively, movement of at least one of the plurality of mobile units is independent of movement of all others of the plurality of mobile units. Additionally, or alternatively, movement of at least one of the plurality of mobile units is interrelated with movement of at least one other of the plurality of mobile units.

It is another object of the invention to disclose a method of positioning at least one of a plurality of mobile units in a FDR comprising steps of providing a free dome range system (FDR) comprising at least one front elevated rail (FER); at least one rear elevated rail (RER); the plurality of mobile units, each of the plurality of mobile units movable along a member of a group consisting of: the at least one FER, the least one RER and any combination thereof; and a controller comprising artificial intelligence (AI), the controller configured to control movement of each of the plurality of mobile units; the controller moving at least one of the plurality of mobile units along a member of a group consisting of: the at least one FER, the least one RER and any combination thereof, thereby positioning at least one of the plurality of mobile units at at least one predetermined location. The controller is configured to control the movement of the plurality of mobile units either independently or as part of an interrelated system of operations.

It is another object of the present invention to disclose the method as defined above, wherein the method additionally comprises a step of providing the FDR comprising a plurality of FERs. Additionally. or alternatively, the method comprises a step of providing the FDR comprising a plurality of RERs. Additionally, or alternatively, the method comprises a step of locating the FER at a front portion of at least one cow stall. Additionally, or alternatively, the method comprises a step of locating the RER at a rear portion of at least one cow stall. Additionally, or alternatively, the method comprises a step of providing a member of a group consisting of the FER, the at least one RER and any combination thereof perpendicular to a line of stalls. Additionally, or alternatively, the method comprises a step of moving the at least one mobile unit manually, semi-automatically, automatically, robotically, by means of an AI-activated computer system and any combination thereof. Additionally, or alternatively, the method comprises a step of reversibly separating the at least one mobile unit from a cow milking system. Additionally. or alternatively, the method comprises a step of selecting the at least one mobile unit from a group consisting of a taxi, a mobile milking unit (MMU); a mobile feeding unit (MFU); a mobile cooling unit (MCU); a mobile milk-transferring unit (MTU); a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally, or alternatively, the method comprises a step of the animal identifying unit providing a member of a group consisting of face recognition, biometric identification, authentication, authorization, verification and any combination thereof. Additionally, or alternatively, the method comprises a step of the tag-free identification unit providing a member of a group consisting of face recognition, biometric identification, authentication and any combination thereof. Additionally. or alternatively, the method comprises a step of the animal documenting unit providing a member of a group consisting of visible and NIR camera photographing or videoing, voice recording, temperature sensing, chemical analysis, biological analysis, physical analysis and any combination thereof. Additionally, or alternatively, the method comprises a step of the animal feed analysis unit providing a member of a group consisting of analysis of grazing time, feed intake volume and/or rate, chewing rate, grazing patterns, eating patterns, rumination patterns and any combination thereof. Additionally, or alternatively, the method comprises a step of the cow health unit providing a member of a group consisting of analysis of general health parameters, specific health parameters and any combination thereof. Additionally, or alternatively, the method comprises a step of the cow health unit providing a member of a group consisting of analysis of eye health, nose health, food intake, estrus diagnosis and any combination thereof. Additionally, or alternatively, the method comprises a step of the taxi reversibly and temporarily connecting to a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally, or alternatively, the method comprises a step of the taxi unit moving a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally, or alternatively, the method comprises a step of moving at least one of the pluralities of mobile units independently of movement of all others of the plurality of mobile units. Additionally, or alternatively, the method comprises a step of moving at least one of the plurality of mobile units with the moving interrelated with moving of at least one other of the plurality of mobile units.

It is another object of the present invention to disclose a method of locating at least one mobile unit at at least one predetermined position in a free dome range system (FDR) comprising steps of providing at least one front elevated rail (FER); and moving the at least one mobile unit along the FER to the at least one predetermined position. It is another object of the present invention to disclose the method as defined above, wherein the method comprises a step of locating the FER at a front portion of at least one cow stall. Additionally, or alternatively, the method comprises a step a step of providing the FDR comprising a plurality of FERs. Additionally, or alternatively, the method comprises a step a step of providing at least one rear elevated rail (RER). Additionally. or alternatively, the method comprises a step a step of locating the RER at a rear portion of at least one cow stall. Additionally, or alternatively, the method comprises a step a step of moving the at least one mobile unit along the at least one RER. Additionally, or alternatively, the method comprises a step a step of providing a member of a group consisting of the FER, the at least one RER and any combination thereof perpendicular to a line of stalls. Additionally, or alternatively, the method comprises a step a step of moving the at least one mobile unit manually, semi-automatically, automatically, robotically, by means of an AI-activated computer system and any combination thereof. Additionally, or alternatively, the method comprises a step a step of reversibly separating the at least one mobile unit from a cow milking system. Additionally, or alternatively, the method comprises a step of selecting the at least one mobile unit from a group consisting of a taxi, a mobile milking unit (MMU); a mobile feeding unit (MFU); a mobile cooling unit (MCU); a mobile milk-transferring unit (MTU); a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally, or alternatively, the method comprises a step of the animal identifying unit providing a member of a group consisting of face recognition, biometric identification, authentication, authorization, verification and any combination thereof. Additionally, or alternatively, the method comprises a step of the tag-free identification unit comprises face recognition, biometric identification, authentication and any combination thereof. Additionally, or alternatively, the method comprises a step of the animal documenting unit providing a member of a group consisting of visible and NIR camera photographing or videoing, voice recording, temperature sensing, breath chemical analysis, biological analysis, physical analysis and any combination thereof. Additionally, or alternatively, the method comprises a step of the animal feed analysis unit providing a member of a group consisting of analysis of grazing time, feed intake volume and/or rate, chewing rate, grazing patterns, eating patterns, rumination patterns and any combination thereof. Additionally. or alternatively, the method comprises a step of the cow health unit providing a member of a group consisting of analysis of general health parameters, specific health parameters and any combination thereof. Additionally, or alternatively, in this method, a cow health unit is providing a member of a group consisting of analysis of eye health, nose health, food intake, estrus diagnosis and any combination thereof. Additionally, or alternatively, the method comprises a step of the taxi reversibly and temporarily connecting to a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally, or alternatively, the method comprises a step of the taxi moving a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally, or alternatively, the method comprises a step of providing a plurality of mobile units. Additionally, or alternatively, the method comprises a step of moving at least one of the plurality of mobile units independently of movement of all others of the plurality of mobile units. Additionally, or alternatively, the method comprises a step of moving at least one of the plurality of mobile units with the moving interrelated with moving of at least one other of the plurality of mobile units.

It is another object of the present invention to disclose a method of providing at least one service at at least one stall in a free dome range system, comprising steps of providing at least one front elevated rail (FER); providing at least one mobile unit; and moving the at least one mobile unit along the FER to the at least one stall. Additionally, or alternatively, the method comprises a step of selecting the service from a group consisting of: milking a cow, cleaning the stall, disinfecting the stall, cleaning a cow, identifying a cow, providing feed for a cow, preparing feed for a cow, identifying a state of health of a cow, documenting the cow, identifying a feeding pattern for the cow, and any combination thereof. Additionally. or alternatively, the method comprises a step of locating the FER at a front portion of at least one cow stall. Additionally. or alternatively, the method comprises a step of moving the at least one mobile unit along at least one rear elevated rail (RER). Additionally, or alternatively, the method comprises a step of locating the RER at a rear portion of at least one cow stall. Additionally, or alternatively, the method comprises a step of providing a member of a group comprising the FER, the RER and any combination thereof perpendicular to a line of stalls. Additionally, or alternatively, the method comprises a step of moving the at least one mobile unit manually, semi-automatically, automatically, robotically, by means of an AI-activated computer system and any combination thereof. Additionally, or alternatively, the method comprises a step of reversibly separating the at least one mobile unit from a cow milking system. Additionally, or alternatively, the method comprises a step of selecting the mobile unit from a group consisting of a taxi, a mobile milking unit (MMU); a mobile feeding unit (MFU); a mobile cooling unit (MCU); a mobile milk-transferring unit (MTU); a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally, or alternatively, the method comprises a step of the animal identifying unit providing a member of a group consisting of face recognition, biometric identification, authentication, authorization, verification and any combination thereof. Additionally, or alternatively, the method comprises a step of the tag-free identification unit providing a member of a group consisting of face recognition, biometric identification, authentication and any combination thereof. Additionally, or alternatively, the method comprises a step of the animal documenting unit providing a member of a group consisting of visible and NIR camera photographing or videoing, voice recording, temperature sensing, chemical analysis, biological analysis, physical analysis and any combination thereof. Additionally. or alternatively, the method comprises a step of the animal feed analysis unit providing a member of a group consisting of analysis of grazing time, feed intake volume and/or rate, chewing rate, grazing patterns, eating patterns, rumination patterns and any combination thereof. Additionally, or alternatively, in the method, cow health unit providing a member of a group consisting of analysis of general health parameters, specific health parameters and any combination thereof. Additionally. or alternatively, the method comprises a step of the cow health unit providing a member of a group consisting of analysis of eye health, nose health, food intake, estrus diagnosis and any combination thereof. Additionally, or alternatively, the method comprises a step of the taxi reversibly and temporarily connecting to a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally, or alternatively, the method comprises a step of the taxi moving a member of a group consisting of an MMU, an MFU, an MCU, an MTU, a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof. Additionally. or alternatively, the method comprises a step of providing a plurality of mobile units. Additionally, or alternatively, the method comprises a step of moving at least one of the pluralities of mobile units independently of movement of all others of the plurality of mobile units. Additionally. or alternatively, the method comprises a step of moving at least one of the plurality of mobile units with the moving interrelated with moving of at least one other of the plurality of mobile units.

The present invention also discloses a dairy farm characterized by an array of n stalls (depicted in figures as n−1, n, n+1, n+2) side-by-side on a dairy animal (low-) level. Each of the stalls is configured by means of size and shape to accommodate a dairy animal (1). The stalls have a main longitudinal axis Y, with a front (feeding-) side (head side, 1h) and an opposite rear (milking) side (tail side, 1t) along the Y axis. The novelty and inventive step of the invention are found in the one or more common elevated road surfaces (2, e.g., thoroughfare, path, surface, substantially horizontal elevated surface, e.g., metal-construction bearing at least one flat plate etc.) provided on a higher level, above the stalls. Such a road surface extends along an X axis that is substantially perpendicular to said Y axis, and constructed to allow free passage of at least one mobile unit, including at least one mobile milking unit (MMU, 10) in a direction along the X axis, along the Y axis, a rotation about the X axis, a rotation about the Y axis, a rotation about the (substantially vertical) Z axis, and any combination thereof.

The terms "road" and "rail" interchangeably refer to one or more roads, rails, substantially horizontally-positioned elevated constructions, e.g., a metal-made (iron, steel) structure, configured so that a module is movable upon, routes, tracks, elevated surfaces on which modules are moveable, paths, pathways, footpaths, lanes, lines of traffic, bars or the like on which modules are moveable or trails.

The invention also discloses a dairy farm as defined in any of the above, wherein the road surface (2) comprises one or more openings (3n) enabling free connection along the vertical Z axis between the road surface and the stall beneath.

The invention also discloses a dairy farm as defined in any of the above, wherein each of said n stalls (e.g., n−1, n, n+1, n+2), at its rear portion, comprises such an opening 3(n−1), 3(n), 3(n+1), respectively.

The invention also discloses a dairy farm as defined in any of the above, wherein the rear portion is located in an area selected from a group consisting of: behind the dairy animal teats (1t); beside the dairy animal teats (1t); in front of the dairy animal teats (1t); and any combination thereof.

The invention also discloses a dairy farm as defined in any of the above, wherein at least one MMU comprises a milking module (LMMU) configured to reciprocate vertically, substantially along the Z axis, thereby either reversibly lowering or reversibly elevating a milking module. The Milking module is configured to milk the dairy animal directly or indirectly; by means of a member of a group consisting of, an extender for horizontal movement, a milking arm and any combination thereof.

The invention also discloses a dairy farm as defined in any of the above, wherein a mobile-unit docking station (6) is provided adjacent to the opening; the docking station comprising means to service the MMUs, the service is selected from a group consisting of providing energy, providing steam, providing at least one fluid, removing at least one fluid, and removing milk.

The invention also discloses a dairy farm as defined in any of the above, wherein a vertical transport mechanism (VTM, 4a-c) is located adjacent to the opening.

In a dairy farm as disclosed in any of the above, an MMU (10) comprising an automated (autonomous) driving system for transporting said MMU along said road surface (2) in a direction along an X axis, along a Y axis, a rotation about the X axis, a rotation about the Y axis, a rotation about the Z axis, and any combination thereof.

The invention also discloses an MMU as defined in any of the above, wherein said MMU comprises means to interconnect to and communicate with a docking mechanism for at least one of loading at least one service to a docking station (6) and unloading at least one service from said docking station (6), the service is selected from a group consisting of providing energy, providing steam, providing at least one fluid, removing at least one fluid, and removing milk.

The invention also discloses an MMU as defined in any of the above, wherein the MMU further comprises a vertical transport mechanism (VTM, 4a-c).

The invention further discloses a method for providing free passage of at least one mobile unit, including at least one mobile milking unit in a dairy farm, the method characterized by steps of providing an array of n stalls (n−1, n, n+1, n+2) side-by-side along an X axis on a dairy animal (low-) level; configuring each of the stalls by means of size and shape to accommodate a dairy animal (1), and each having, along a main longitudinal axis Y substantially perpendicular to said axis X, a front (feeding-) side (head side, 1h) and an opposite rear (milking-) side (tail side, 1t); providing a common elevated road surface (2) on a higher level, above the stalls; configuring the road surface (2) to extend along said axis X being substantially perpendicular to axis Y, and constructing the same to allow at least one MMU (10) a free passage in a direction along said X axis, along said Y axis, a rotation about the X axis, a rotation about the Y axis, a rotation about the Z axis, and any combination thereof.

The invention also discloses a method for providing free passage of at least one mobile unit as defined above, wherein the method further comprises a step of providing said road surface (2) with one or more openings (3n) enabling free connection along the vertical Z axis between an upper surface of the road surface and the stall beneath.

The invention also discloses a method for providing free passage of at least one mobile unit wherein the method further comprises a step of providing each n stall (e.g., n−1, n, n+1, n+2), at its rear, front or lateral (side-) portion, such an opening 3(n−1), 3(n), 3(n+1), 3*n+2), respectively.

The invention also discloses the method as defined in any of the above, wherein the method further comprises a step of providing the opening in an area being adjacent and behind the dairy animal's teats (1t). Additionally, or alternatively, the invention also discloses method as defined in any of the above, wherein the method further comprises a step of providing the opening in an area being adjacent and aside the dairy animal's teats. Additionally, or alternatively, the invention also discloses method as defined in any of the above, wherein the method further comprises a step of providing the opening in an area being adjacent and in front of the dairy animal's teats.

The invention also discloses an MMU which comprises, is in connection, and/or in communication with a milking module configured to advance towards the dairy animal's teats, in a movement provided in a manner selected from a group consisting of (i) moving, during at least one portion of the whole movement, below the dairy animal, at teat height, at a height of about the middle of the dairy animal, above the dairy animal and any combination thereof; (ii), moving, during at least one portion of the whole movement, in a direction selected from a group consisting of toward the dairy animal, away from the dairy animal, along the dairy animal, in the dairy animal's rear portion, in the dairy animal's side (lateral-) portion, in the dairy animal's front portion and any combination and orientation thereof.

The invention also discloses a method as defined in any of the above, wherein the method further comprises a step of advancing a milking module towards dairy animal's teats, in a movement provided in a manner selected from a group consisting of (i) moving, during at least one portion of the whole movement, below the dairy animal, at teat height, at a height of about the middle of the dairy animal, above the dairy animal and any combination thereof; (i), moving, during at least one portion of the whole movement, in a direction selected from a group consisting of toward the dairy animal, away from the dairy animal, along the dairy animal, in the dairy animal's rear portion, in the dairy animal's side (lateral-) portion, in the dairy animal's front portion and any combination and orientation thereof.

The invention also discloses a method as defined in any of the above, wherein the method further comprises a step of advancing a milking module towards the dairy animal's teats, in a movement provided in a manner selected from a group consisting of (i) moving, during at least one portion of the whole movement, below the dairy animal, at teat height, at a height of about the middle of the dairy animal, above the dairy animal and any combination thereof; (ii), moving, during at least one portion of the whole movement, in a direction selected from a group consisting of toward the dairy animal, away from the dairy animal, along the dairy animal, in the dairy animal's rear portion, in the dairy animal's side (lateral-) portion, in the dairy animal's front portion and any combination and orientation thereof.

The invention also discloses a method as defined in any of the above, wherein the method further comprises a step of providing the mobile-unit docking station (6) adjacent to the opening; optionally, further providing the docking station with means to service the MMUs, the service is selected from a group consisting of energy, steam, fluids, and milk.

The invention also discloses a method as defined in any of the above, wherein the method further comprises a step of locating the vertical transport mechanism (VTM, 4a-c) adjacent the opening.

It is further in the scope of the invention to disclose, in a stall, a gate located between the animal and the feeding line thereby configured to at least temporarily prevent or otherwise limit free access of said animal to its feed.

It is also in the scope of the invention to disclose a stall as defined above, further characterized by a set of frontal gate and rear gate, said frontal gate located between the animal and the feeding line, said rear gate located between the rear portion of the animal and the scraping line.

It is further in the scope of the invention to disclose a stall as defined in any of the above, wherein said front gate, said rear gate or both are movable along the main longitudinal axis of the stall.

It is further in the scope of the invention to disclose an FDR system comprising at least one stall, within said stall, a gate located between the animal and the feeding line thereby configured to at least temporarily prevent or otherwise limit free access of said animal to its feed.

It is further in the scope of the invention to disclose an FDR system, characterized by a set of frontal gate and rear gate, said frontal gate located between the animal and the feeding line, said rear gate located between the rear portion of the animal and the scraping line.

It is further in the scope of the invention to disclose an FDR system as defined in any of eth above, wherein said front gate, said rear gate or both are movable along the main longitudinal axis of the stall.

It is also in the scope of the invention to disclose a method to at least temporarily preventing or otherwise limiting free access of an animal to its feed, comprising providing a gate and locating it between said animal and the feeding line.

It is also in the scope of the invention to disclose a method as defined above, further comprising steps of locating said frontal gate between the animal and the feeding line; and locating said rear gate between the rear portion of the animal and the scraping line.

It is also in the scope of the invention to disclose a method as defined above, further comprising steps of providing said front gate, said rear gate or both to be movable along the main longitudinal axis of the stall.

It is also in the scope of the invention to disclose the method as defined above, comprising step of identifying said dairy animal as a dried animal. It is also in the scope of the invention to disclose the method as defined in any of the above, comprising step of upon identifying said dairy animal (e.g., by means of tag or biometric features) as a dried animal, closing said gate or otherwise let the gate rest in its close configuration. It is also in the scope of the invention to disclose the method as defined in any of the above, further comprising step of upon identifying said dairy animal as a dried animal, intercommunicating with a computerized operator, and then, upon verification of said specific animal updated feeding program, closing said gate or otherwise let the gate rest in its close configuration.

BRIEF DESCRIPTION OF THE FIGURES

The disclosure will provide details in the following description of one or more embodiments with reference to the following figures. The figures are not necessarily to scale. The figures are merely schematic representations, not intended to portray specific parameters of the one or more embodiments of the invention. The figures are intended to depict only typical embodiments of the invention. In the figures, like numbering represents like elements. The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION OF THE PREFERRED EMBODIMENTS

Figure 1A:
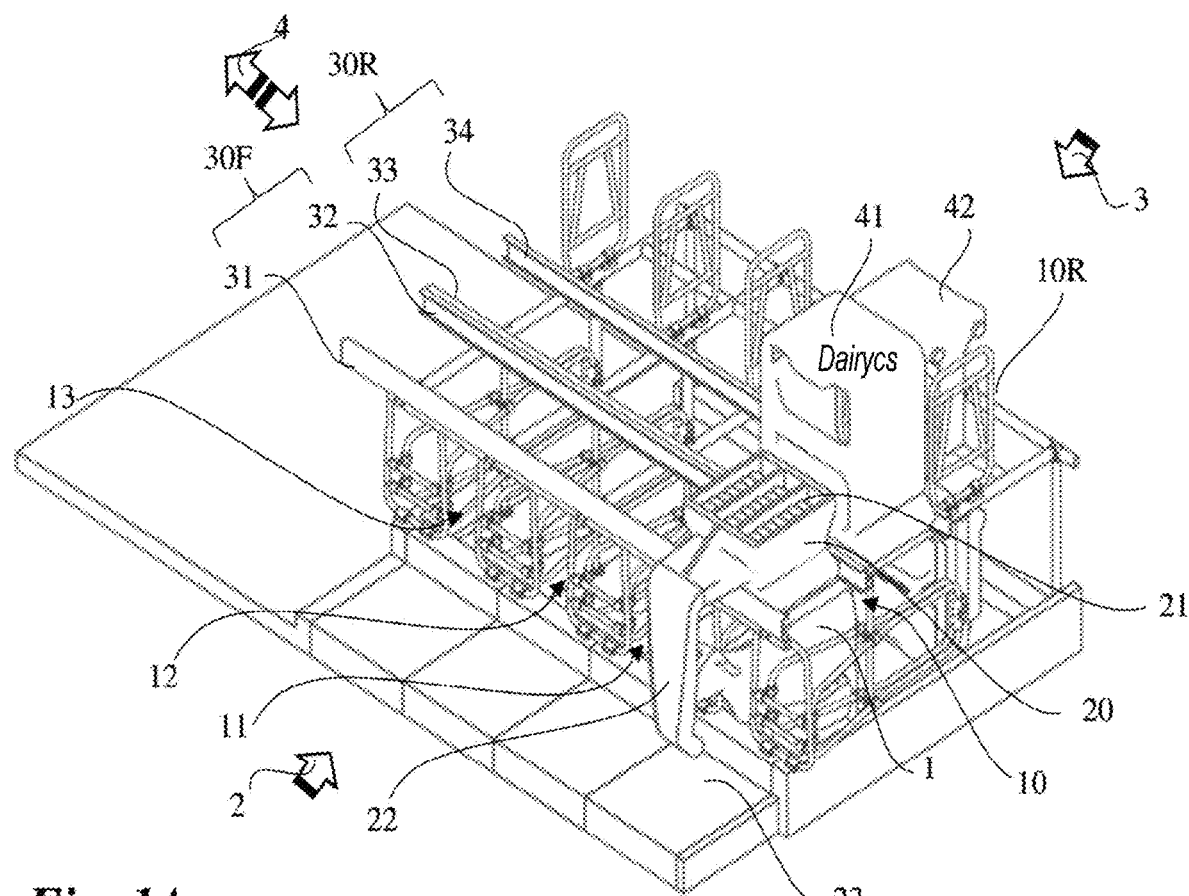
FIGS. 1A and 1B schematically illustrate a perspective view of a few of the stalls in an embodiment of an FDR which has both front and rear elevated rail systems, showing (FIG. 1A) a mobile feeding unit providing feed for a cow located in a first stall and (FIG. 1B) the mobile feeding unit providing feed for another cow located in a second stall.

The following description is provided, so as to enable any person skilled in the art to make use of the invention and sets forth examples contemplated by the inventor of carrying out this invention. Various modifications, however, are adapted to remain apparent to those skilled in the art, since the generic principles of the present invention have been defined specifically to provide an FDR comprising an elevated rail system located above the front portion of the stall along which one or more mobile units are movable, and systems, modules, units and methods thereof.

The term 'feeding' refers to any combination of preparing or otherwise providing the animal either a single food or a mixture of two or more foods types; introducing special foods, such as a diet food, a tailor-made, animal-specific and/or condition (estrus, sickness, pre- or after-birth) foods; wet or dry food, or concentrate food; admixing additives (e.g., medicaments, special foods, minerals, vitamins, proteins, lipids, moisture etc.).

The mobile units are selected in a non-limiting manner from a group consisting of, inter alia, a mobile feeding unit (MFU); a mobile cooling unit (MCU); a mobile milk-transferring unit (MTU); a stall cleaning unit (in some embodiments, this can also clean the animal), an animal cleaning unit; a food arranging unit; one or more of the following: an animal measuring unit, an animal identifying unit that can include face recognition, biometric identification, authentication, authorization and verification; a tag-free identification, unit that can include face recognition, biometric identification, and authentication; one or more of the following: an animal health-scoring unit; an animal documenting unit, including visible and NIR camera photographing or videoing, voice recording, temperature sensing, breath chemical, biological and physical analysis etc.; an animal-to-stall matching unit and/or animal-to-milking group matching unit; animal feed analyzing, e.g., grazing time, feed intake volume and/or rate, chewing rate, grazing patterns, eating patterns, rumination patterns; and a cow health unit (general health parameters and/or specific health parameters, including e.g., eye health, nose health, cow behavior, such as cow behavior during milking that needs a special treatment before or during milking or a different pattern or way of teat attachment and milking procedure. etc.); feed intake; estrus diagnosis; an alerting unit and any combination thereof; and one or more of the following: a feed pushing unit, a feed remixing unit, a feed compressing or compacting unit, a refreshing or spreading unit, a feed autoloading unit, and a food preparing unit; energy recharging unit water loading unit, steam generating unit, heat exchange unit, MMU-supplying units for providing MMUs with required inlets (energy, steam, water, iodine for teat-after-treatment etc.), tug unit or tow unit to mobile static units, and any combination thereof.

The stall cleaning unit can provide at least one of pre-defined and well-focused airflow(s) and/or predefined and well-focused pulses of air, vacuum, floor cleansing material, water for floor cleansing, floor wiping, stall refreshing, application of steam, application of water, application of soap, brushing and drying of the stall and/or its surroundings, scrubbing of the stall, brushing of the stall, and disinfection for the stall and/or its surroundings.

The stall cleaning unit and the animal cleaning unit can provide predefined and well-focused airflow(s) and/or predefined and well-focused pulses of air, vacuum, application of steam, application of water, application of soap, brushing and drying of the animal or a portion thereof (udder, teats area, back, head etc.), scrubbing of the animal, brushing of the animal, and disinfection for the animal.

Disinfection can also comprise decontamination, such as removing or killing contaminants such as micro-organisms, causes of infectious diseases etc.

According to some embodiments of the invention, a plurality of mobile units is configured to be moved along the rail. A mobile unit can comprise, in a nonlimiting manner, a mobile feeding unit (MFU), a mobile cooling unit (MCU), a mobile milk-transferring unit (MTU) and any combination thereof. A mobile unit can be moved along the rail manually, semi-automatically, automatically, robotically, by means of an artificial intelligence (AI)-based computer system and any combination thereof. The locomotion of the units can be provided by any suitable means, e.g., an electrically driven system, a mechanically driven system, a pneumatically driven system, etc.

The mobile unit can be independently mobile, i.e., comprising the means by which it can be moved, it can be reversibly attachable to a taxi unit, and any combination thereof. A taxi unit is a module movable on at least one rail that comprises a suitable locomotion means and that is reversibly attachable to at least one mobile unit. A taxi unit can be moved along the rail manually, semi-automatically, automatically, robotically, by means of an AI-activated computer system and any combination thereof.

Each of the mobile units (including its functions) can be operated independently, as an interrelated part of a cow-care system comprising movement of more than one mobile unit, and any combination thereof. The cow-care system can comprise an operation to prepare a cow for milking, milking a cow, providing for the cow's comfort before and during milking so as to keep the cow in an optimum condition for milking and thereby stimulate optimum milk production, an operation to treat a cow after completion of milking, stall cleaning, ensuring cow hygiene, ensuring milk hygiene, providing feed for the cow, food diagnostics, making the stall area attractive for milking and feeding for optimum cow comfort, cow welfare and cow health, and any combination thereof.

An integrated and interrelated AI-based system can be configured to provide optimal results for each individual cow, for non-limiting example, providing more cooling for a larger cow than for a smaller cow, providing an optimized volume of feed, providing an optimized type of feed, providing an optimized texture of feed, changing any combination of feed volume, feed type and feed texture based on health status, and any combination thereof. It should be noted that, since a cow can be individually identified, the correct optimized treatment can be provided to a cow independent of the milking stall she enters.

It should further be noted that a taxi, having delivered a mobile unit to one cow, can be detached from the mobile unit. Once detached, the taxi can be used for any other purpose, including, but not limited to, delivering a mobile unit to another cow, delivering milk to a collection point, collecting feed from a storage area, recharging a water tank, recharging cleaning material, refilling an air tank, refilling cow treatment storage compartments, and any combination thereof.

Reference is now made to FIG. 1A, schematically illustrating an FDR comprising a plurality of stalls (10-14) and an MFU (20) movable along a front elevated rail system (31F) to feed a diary animal (1) when milked in its stall (10). In this arrangement, both a front rail system (FER. 30F) and a rear elevated rail (RER) are provided in parallel, perpendicular to the stall lines. A Cow (1) freely entered into a stall (10) to be milked, passing from the rear portion (2) of the stalls and elevated rails systems, via a rear stall gate 10R, to milked by an MMU (32) attached to a taxi module (31) movable in directions (4) on (or otherwise below or to the side of) RER (30R). In this example, an autonomously actuated taxi module 42 is currently attached to an MMU (0.41) which is located above the rear portion of the stall (10). After the MMU (41) introduces the cow (1) milking system to the rear portion of the cow within the stall (10), the MMU (41) or an interconnectable module, e.g., an autonomous movable taxi unit (42), is reversibly separable from the milking system and is ready for further tasks. e.g., to transfer other milking systems to other cows in neighboring stalls, to deliver a movable intermediate milk container (not shown here) to accept milk from other stalls in the line or unload the milk to a milk emptying facility along the line.

Figure 1B:
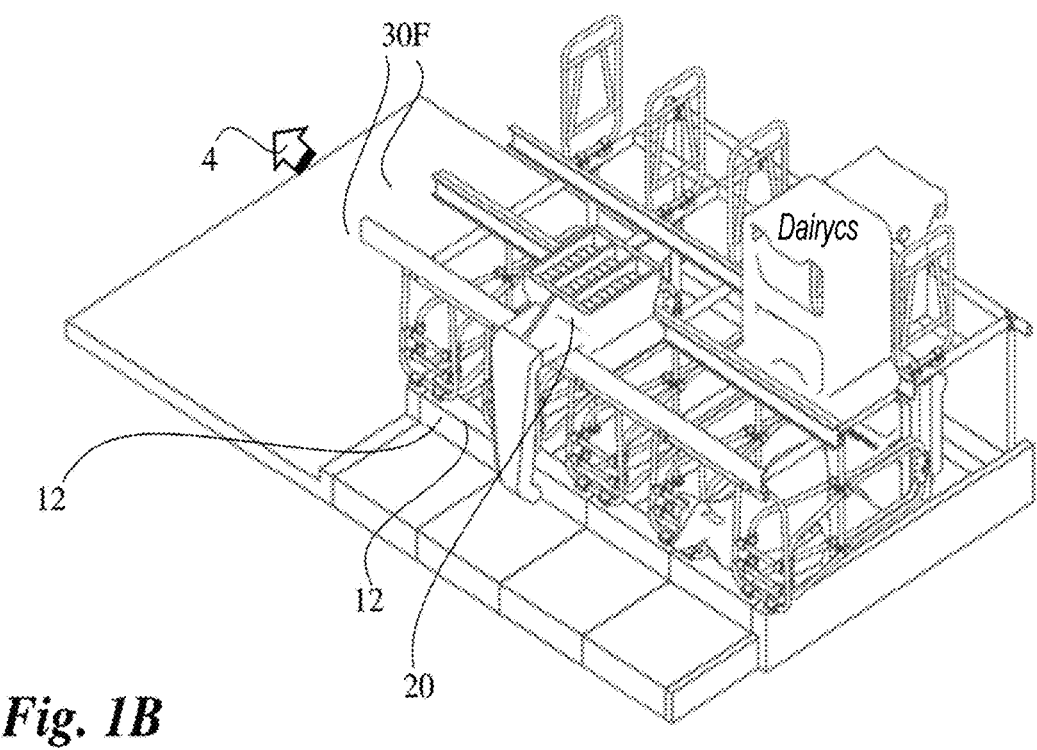

It should be noted that the taxi that delivers a mobile unit, in the exemplary case of FIG. 1A-B, an MMU, to a stall need not be the same as the taxi that transfers the mobile unit to another stall, and, similarly, a taxi that delivers a milking system to a cow need not be the taxi that collects the milking system from the cow and delivers it to another cow.

In some embodiments, modules such as an MMU, an MFU, an MTU and an MCC are mobile units, autonomously movable along at least one FER, at least one RER and any combination thereof. In some embodiments, the modules are passive units, configured to be reversibly and temporarily attachable to a moving mechanism such as a taxi (41), with the taxi with attached module being movable along at least one FER and/or at least one RER. A taxi on a rear rail can be configured to move a mobile unit along at least one FER, a mobile unit along at least one RER and any combination thereof; and, similarly, a taxi on an FER can be configured to move a mobile unit along at least one FER, a mobile unit along at least one RER and any combination thereof.

The FER (30F) comprises here two parallel rails (31 and 32), and the RER (30R) comprises two parallel rails (33 and 34). It is well within the scope of invention where each of the elevated rail systems comprises, in at least a portion of the line, one rail, two rails, and even three, four or more rails. Some of the rails disclosed in the invention are configured to be concurrently used by FER, RER or both, see e.g., middle and mutual rail (32-33) having two sides: a front side (32) and rear side (33). In this illustration, the RER and the FER are provided in parallel, yet other arrangements are possible, for example, a standalone (namely only one type of rail) or in combination with other types of rail, including a mutual middle rail where an RER is provided on the rear side of one or more rails with an FER provided on the front side of those rails. Similarly, an upper portion of the rail(s) serves mobile units of the front side (2) of the stalls and a lower portion of the rail(s) concurrently serves mobile units of the rear side (3) of same stalls, and vice versa.

Referring again to FIG. 1A, whilst the cow (1) in a stall (10) is milked by an MMU (42), a feeder (20) feeds the cow. In very general terms, the MFU (20) comprises a top portion (21) adapted to accept either a metered-dose batch food portion or a continuous flow of the same, and, in some embodiments, to process it. e.g., by grinding or milling it to a smooth food serving, wetting it, admixing various feed ingredients, measure its quantity, etc. The food portion is then administered in front of the milked cow (1) e.g., by means of a hose (22). A cultivating unit, a food gathering unit, a measurement module such as a camera (thermal or optic), a sensor and any combination thereof can be affixed on, in, or in connection with the front hose (22). The front hose can direct the feed to a front eating zone (23). The hose member can be configured, according to various embodiments of the invention, still in a non-limiting manner, for being activated as a feed pusher, feed remixer, and feed compressor/spreader.

Reference is now made to FIG. 1B, presenting the same, where an MFU (20) has been moved sideward (4) on an FER (30F) from one stall (10) to a second stall (12), e.g., to feed a neighboring cow. The MMU on the RER is independently movable; here its current location remains above the first stall (10), as the MMU is still robotically milking the first cow (1).

Figure 2A:
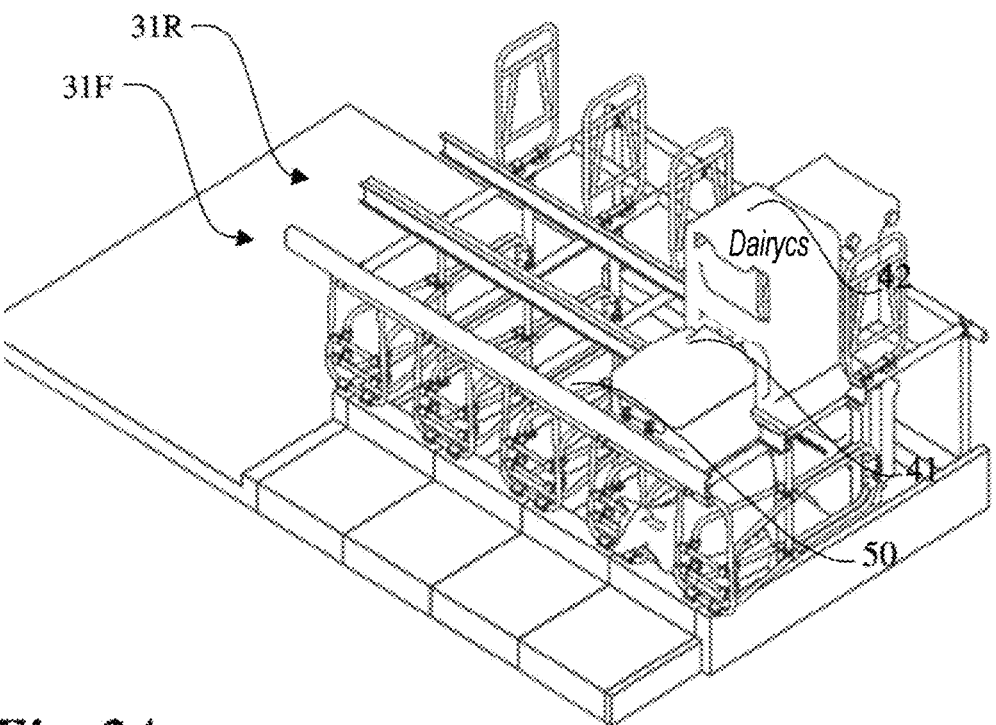
FIGS. 2A and 2B schematically illustrate a perspective view of a few of the stalls in an embodiment of an FDR which has both front and rear elevated rail systems showing (FIG. 2A) a mobile milk-transferring unit accepting milk from a cow located in a first stall, e.g., the cow is being milked by an MMU of a rear elevated rail system, and (FIG. 2B), the MMU being moved, either to another stall to milk a second cow or to a remote location where it can empty the milk into another milk container.

Reference is now made to FIG. 2A, schematically illustrating a synergistic FDR of the present invention, comprising a plurality of stalls (10-14) and a mobile milk-transferring unit (MTU, 20), movable along the front elevated rail system (31F) to temporarily accommodate milk milked by an MMU mobile along a rear elevated rail system, and to transfer the milk to a terminal milk container (not shown here). MTU is movable along the FER (31F) whilst the taxi (41) and MMU (42) are movable along the RER (31R).

In some embodiments, an MTU is communicable with an MMU by means of a fluid connection tubing line. When connected, milk from the MMU flows via the tubing line. After loading at least portion of the milk, the connection between the two modules is ended and the MTU is free to move to other sites along an FER. In some embodiments, the MTU has direct communication with an MMU. In other embodiments, an MTU milk tubing line is indirectly connected to an MMU via a taxi. Can be connected for transferring the milk and disconnected thereafter.

It is in the scope of the invention where an MTU has a self-contained milk cooling system or otherwise is in connection with other cooling systems, e.g., a cooling system incorporated along an FER. An MTU can further comprise another supporting system, such as a heating capability (e.g., pasteurizing or decontaminating facilities), a milk-diagnosing and analyzing means, a container-cleansing system, etc. and any combination thereof.

Figure 2B:
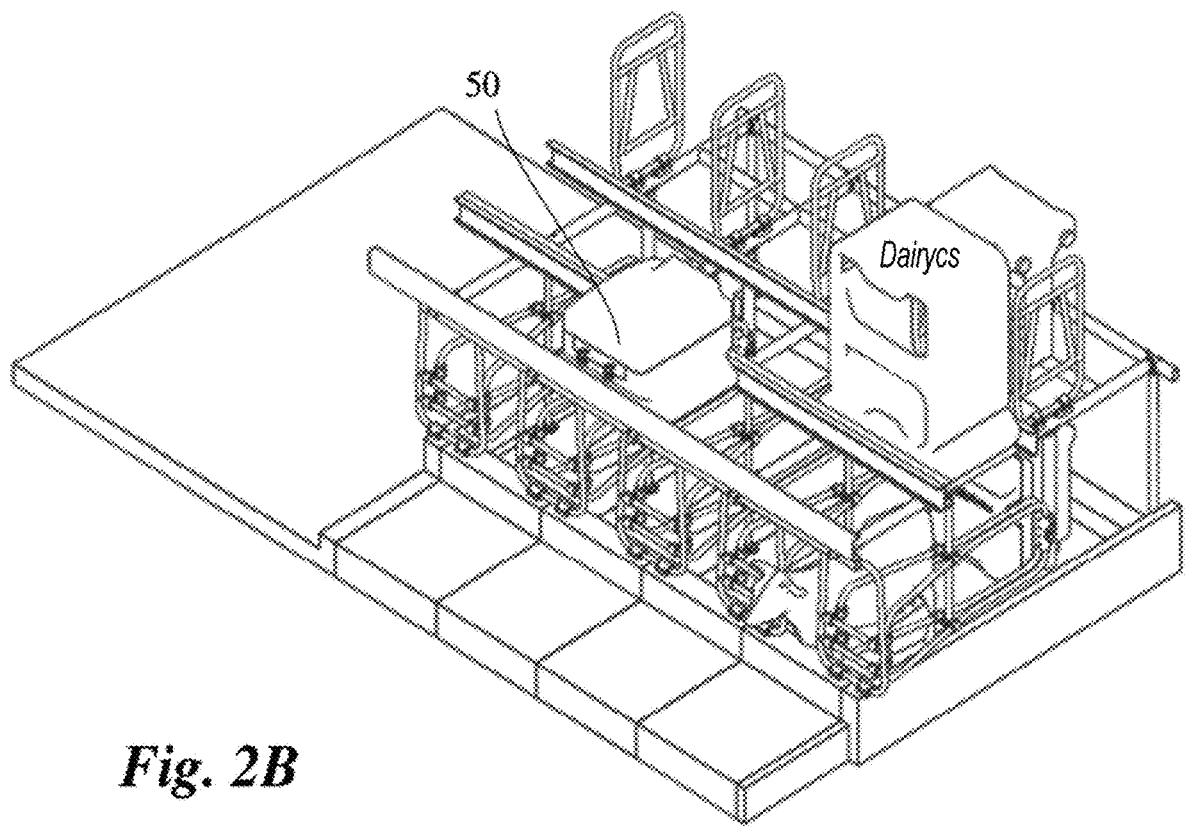

Reference is now made to FIG. 2B, presenting the same, where the MTU (50) is detached from a taxi/MMU, and has been moved from one stall (10) to another stall (12) along an FER (30F) in a direction (4). e.g., to be ready for inflow of new milk or to unload its milk into a terminal milk container (not shown).

Dairy cows generate heat. As an example, a cow providing 54 kg of milk per day generates about 6,300 BTU per hour, twice as much heat as a cow producing only 18 kg of milk per day (3,300 BTU/h), and 19 times the 330 BTU/h a human produce at rest. While cows are quite cold tolerant, they are heat stressed at a temperature that most humans find comfortable; their thermoneutral zone is in the range of about 4° C. to about 21° C.

Figure 3A:
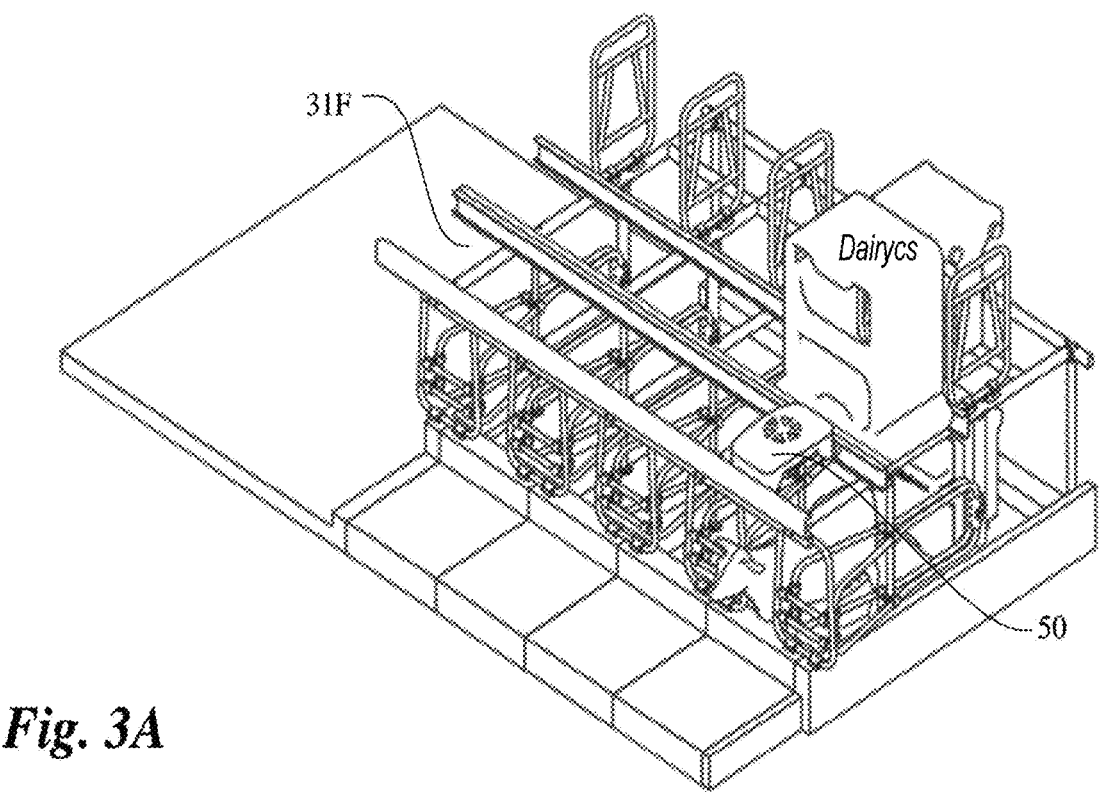
FIGS. 3A and 3B schematically illustrate a perspective view of a few stalls in an embodiment of an FDR which has both front and rear elevated rail systems, showing (FIG. 3A) a mobile cooling unit chilling a cow located in a first stall and (FIG. 3B), the mobile cooling unit being moved to a neighboring stall, e.g., to cool a second cow.
Figure 3B:
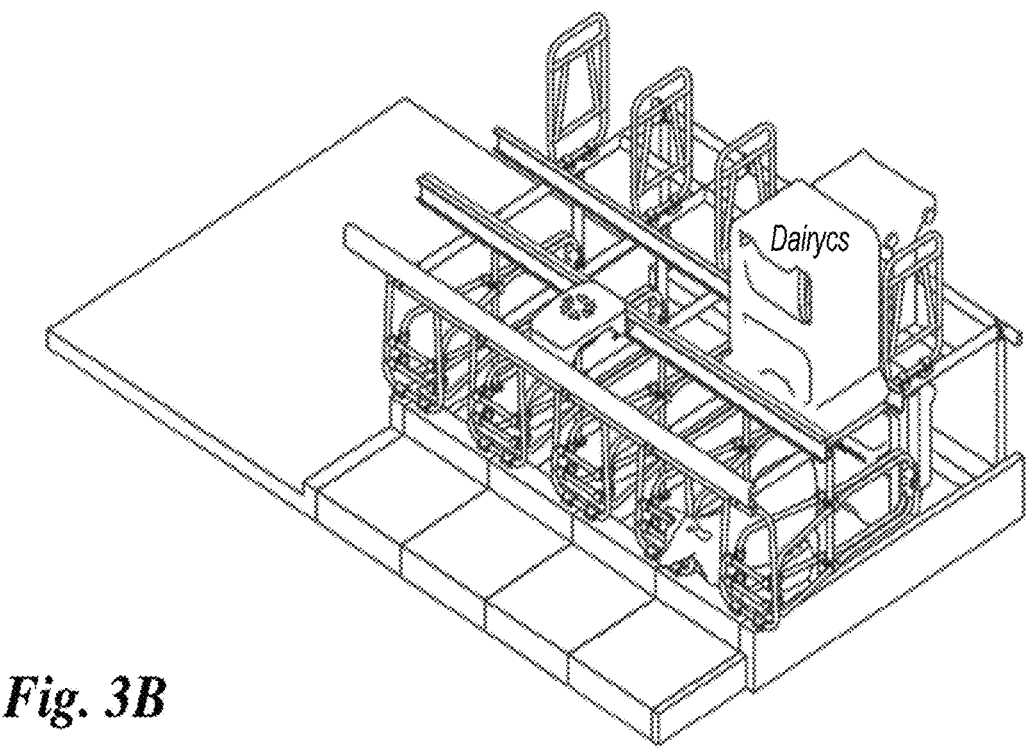

It is preferable, when designing a comfortable thermal environment for dairy cattle, that it functions independent of human intervention. Reference is thus now made to FIG. 3A, schematically illustrating an FDR comprising a plurality of stalls (10-14) and a mobile cooling unit (MCU, 50), movable along the front elevated rail system (31F) to cool the stall where the cow is milked during milking. FIG. 3B shows the same, except that the MCU (50) has been moved, either autonomously or by a taxi, to another stall after chilling the milked cow (1) in the first stall (10).

The term 'cooling' refers to cooling, chilling, heat exchanging, thermal regulating, air conditioning, ventilating, increasing humidity (& relative humidity), heat absorbing etc.

The system will typically comprise fewer taxi units than MMUs, MCUs, MFUs. MTUs, MCCs, stall cleaning units, animal cleaning units and other units. However, in some embodiments, there are as many or more taxi units as MMUs, MCUs, MFUs, MTUs, MCCs, stall cleaning units, animal cleaning units and other units.

A system can comprise any combination of MMUs, MCUs, MFUs. MTUs, MCCs, stall cleaning units, animal cleaning units and other units. For non-limiting examples, a system can comprise mobile MMUs only, while another exemplary unit comprises only taxis and passive MMUs, with another comprising taxis, mobile MMUs, passive MMUs, as well as MFUs and MTUs.

The integration of the modules (FER. RER, the mobile units, and the taxis, if present) with an intelligent and adaptive AI system to perform all operations (including feeding) before, during and after milking, can be configured to optimize the flow of cows into the system, both on the level of the treatment of an individual cow and on the level of the flow of cows through a cow stall area such as, for example, a milking parlor. All to achieve optimal visits of the cows to the stall and maximum utilized time of the cows staying in the stalls: for feeding and milking and maximum milking capacity of the system.

The system is adaptive, being configured to learn, so that treatment of each cow can be adapted to the condition of the cow, if and when such condition changes. The system can prepare each cow that is supposed to be milked during its visit to a manger, while taking advantage of the order of appearance of the cows and the maximum time needed to prepare the cow for milking, milk her and provide after-milking care and treatment. In this way, the cow's convenience and her well-being can be maximized during her time in a milking stall (during feeding and milking), resulting in more milk, higher quality milk and greater cow health. In addition, a cow will want to enter a feeding/milking stall, where she will benefit from environmental conditions and services individually configurable for her comfort and convenience.

The synergistic combination of FER and RER is hereto discussed and a few examples are provided:

In a first example, one or more mobile milking units are mobilized along one or more RERs to milk cows, at time intervals correlated with the time when cows freely enter any of the stalls or standing within the stalls for feeding. Concurrently, one or more mobile feeding units are mobilized along one or more FERs towards these one or more stalls. Still at the same time, simultaneously, same or other FER(s) are carrying one or more mobile feeding units, one or more mobile milk transfer units, one or more mobile cooling units and/or other mobile units with different services as listed above.

In a second example, one or more mobile feeding units are mobilized along FER to feed cows with an additional food, and thereby completing defined (e.g., personalized per cow) nutrition, in accordance with cows specific and condition-related feed scheme. Such a personalized feed mechanism synergistically shortening cows' preparation time, increasing the effectivity of attracting the cows to enter the stalls, and improved health of the entire herd by that each cow is milked upon its individual (personalized-) milking-interval.

In a third example, one or more mobile milking units are concurrently mobilized along FER for cooling cows in their stalls before and during milking. Such a personalized and accurately timed cooling in each of the stalls along time ensures a convenient and effective micro-climate in stall, and hence significantly increases both (a) yields of milking and (b) quality life of the cow.

In a fourth example, one or more mobile milk transfer units on one or more FERs are emptying one or more mobile milking units on one or more RERs at a timed procedure, namely immediately after cows are milked. Shortly after that, the mobile milk transfer units carry the milk, along the FERs, to one or more milk collecting points. Hence, the hereto emptied mobile milking units are allowed to continue milking other cows so that milking capacity of the farm increase.

In a fifth example, any given mobile service units running along FER in a timed manner, provides a synergistic increase in both agrotechnical parameters (e.g., higher milk yield, better milk quality) and cow's wealth, when combined with the concurrent operation of other mobile service units running along RER.

While this invention has been described fully and completely with special emphasis upon a preferred embodiment, it should be understood that within the scope of the appended claims the invention may be practiced otherwise than as specifically described herein.

Another aspect of the invention is a dairy farm with an elevated road for free transport of mobile units and methods thereof.

Figures 4, 5:
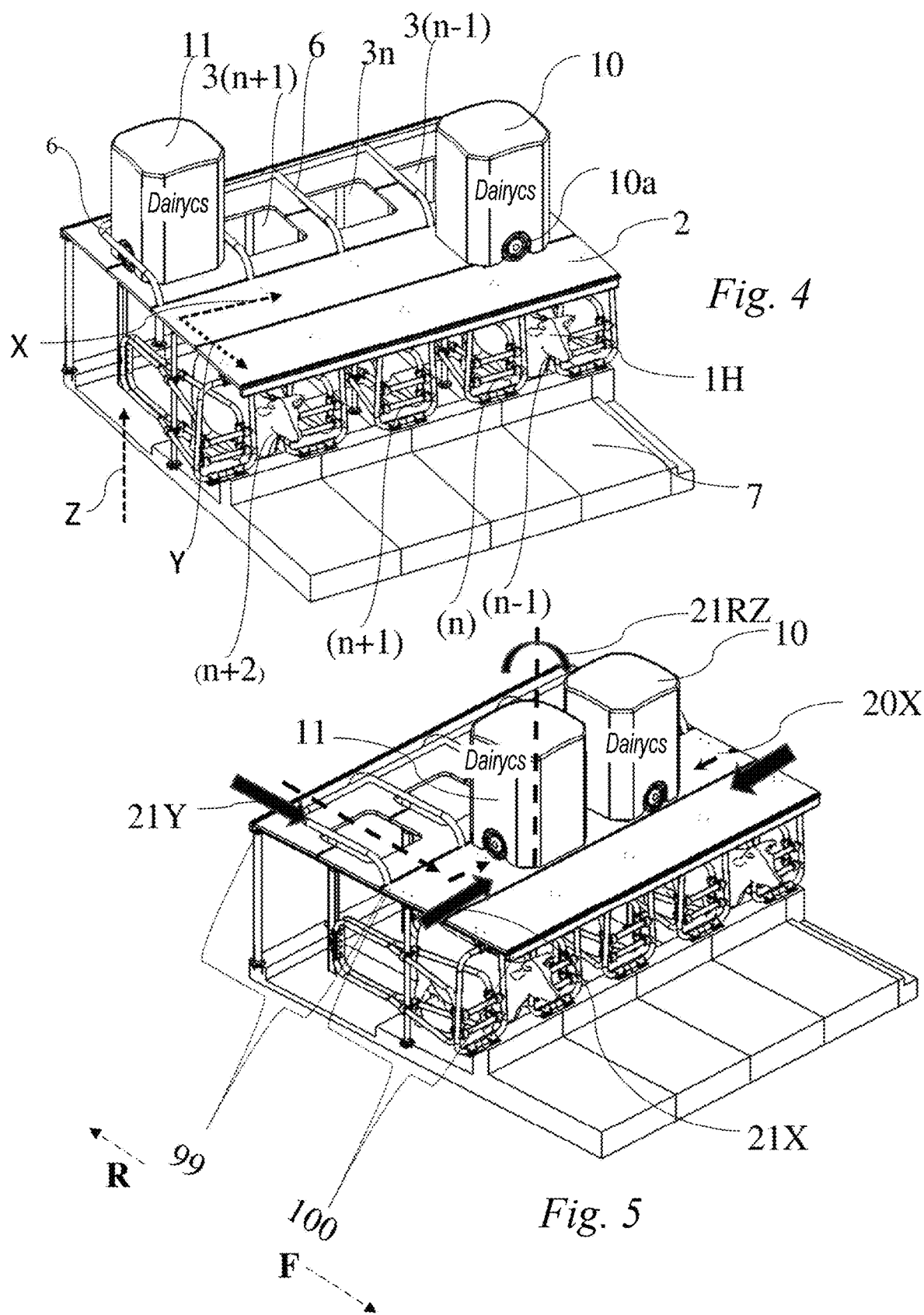
FIGS. 4-12 schematically illustrate a dairy farm with road surface above the stalls and MMUs thereon according to one embodiment of the invention.

Reference is hence made to FIG. 4 to FIG. 14, each of which illustrates in an out of scale manner an embodiment of a dairy farm with a road surface above the stalls for free transport of at least one mobile milking unit (MMU). In one embodiment of the invention, the dairy farm is a free dome range (FDR) as defined in WO/2018/008026 and IL268978, both are incorporated herein as references. In other embodiments, the embodiment pertains to other types of dairy farms, such as small, medium and large farms, free-stall dairies, drylot dairies, pasture-based dairies, housed dairy farms, experimental dairy farms, extensively grazed dairy farms, hand milking farms, vacuum bucket milking farms, milking pipeline farms, milking parlors (such as herringbone and parallel parlors and rotary parlors), automatic milker take-off, fully automated robotic milking farms, and any combination thereof. As shown in FIGS. 4-5, the farm comprises, inter alia and in a non-limiting manner, a side-by-side (namely, along the main X axis) array of four stalls, i.e., (n−1), n, (n+1) and (n+2). A dairy animal (here a cow) is temporarily accommodated within an $n^{th}$ stall along the Y main axis, with its head facing the front side (100, F) towards a feeding path (7), and its tail facing the opposite direction, namely the rear side (99, R). The stalls' ceiling (roof) provides a substantially continuous second floor, configured in this invention as a road surface (2) above the stalls for the at least one MMU (e.g., 10, 11) and for other types of mobile unit, some of which are discussed below. Each of the stalls and the road surface above them are characterized by a front portion 100 (F) and a rear portion 99 (R).

In one embodiment of the invention there is provided, in the rear portion of each of the aforesaid stalls, an opening 3(n−1), 3n, 3(n+1) and 3(n+2) respectively. In another embodiment of the invention there is provided, in the side portion of each of the aforesaid stalls, the opening 3(n−1), 3n, 3(n+1) and 3(n+2) respectively. The term "side portion" refers to either, both or all of the following: (i) rear and at least a portion of a side, (ii) about the middle of a long side of the stall, including at least a portion of the side, (iii) at least a portion of a side, and (iv) front and at least a portion of a side; where the "side" is either or both of the right side or left side with respect to a dairy animal standing in a stall.

Openings are configured by means of size, shape and location to allow the delivery of items along the vertical Z main axis, from the road surface (2, second floor) to the rear portion of the cow located at stall n, first floor, and vice versa. Each opening and the rails around it provide for an upper docking station. Power inlets, fluid inlets and outlets, communication interfaces and other interconnectable assemblies are not shown in these simplified drawings.

Although any mammal can produce milk, commercial dairy farms are typically one-species enterprises. In developed countries, dairy farms typically consist of high-producing dairy cows. Other species used in commercial dairy farming include goats, donkeys, sheep and camels.

There can be various types of mobile unit in the dairy farm, e.g., MMUs, feeders, coolers etc. The term MMU refers in the following to all types of movable machinery and module thereof in the dairy farm and not only for milking modules. It is further in the scope of the invention that at least one of the MMUs is movable on the upper road surface, and optionally at least one of the MMUs is movable on in upper rail; whereas the rail is either interconnected with the road or is being separated from the road. It is also in the scope of the invention that such a Feeding-MMU that is moving on the road surface or on an upper rail is capable, via a predefined mechanism, to download food to each cow.

Reference is made again to FIG. 4, presenting two MMUs. MMU 11 is parking above opining 3(n+2), i.e., above stall (n+2), facing front side, along the Y axis. MMU 10 above stall (n−1) is directed sideward (parallel the X axis) on the rear portion, i.e., lane 2R, of the road surface (2), that is schematically projected here as a flat driving platform, yet may acquire various shapes and dimensions.

MMU transportation can be provided by any suitable mechanism, e.g., by having a set of two or four wheels or bearings, see for example left and front wheel 10a in MMU 10, FIG. 5. MMUs are autonomous vehicles, semi-autonomous vehicles (e.g., movable along Z axis, yet not movable along X or Y axes etc.; or passive (static) platforms that are towed, dragged or carried by, or otherwise interconnected or anchored to a taxi or other MMU for their movement. In very general terms, portable MMUs are movable along a combination of X and Y directions, and can also rotate around (cycle or spin around) their Z axis. In some embodiments, at least one MMU can rotate about an axis selected from a group consisting of the X axis, the Y axis, the Z axis and any combination thereof.

The heretofore disclosed arrangement of two parallel upper lanes 2R and 2F, is configured to allow a first MMU to easily get around or bypass a second MMU. Reference hence is now made to FIG. 5 showing two concurrent movements of MMU 10 and MMU 11. MMU 10 moves along the 2R lane from (n−1) to (n), parallel to the X axis. At the same time, MMU 11 moves in a sequence of three steps: (i) moving from its parking zone at the docking station at (n+2), along the Y axis, to the 2R lane; (ii) moving to the (n+1) location at lane 2R; and then (iii); rotating (arrow 21RZ) along the Z axis at the same place to face again the Y axis.

Figure 6:
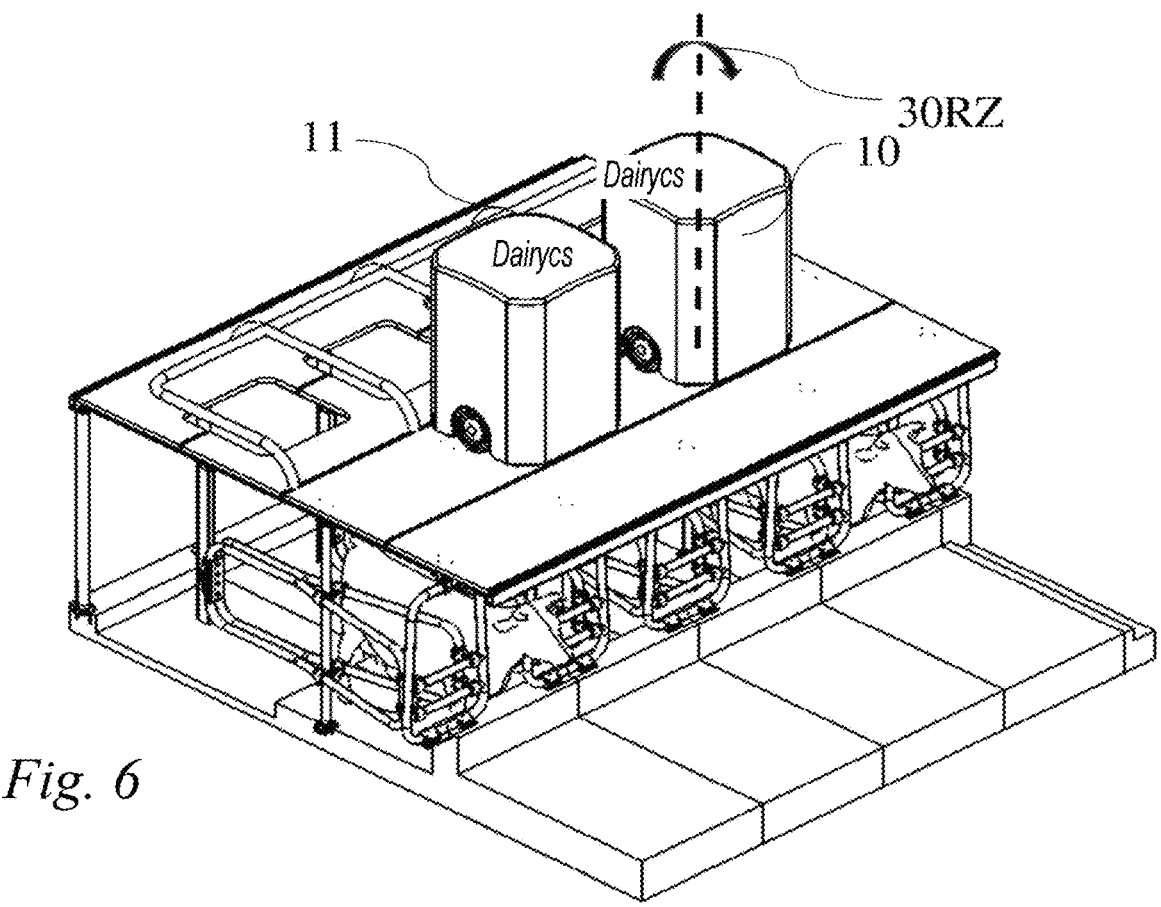
Figure 7:
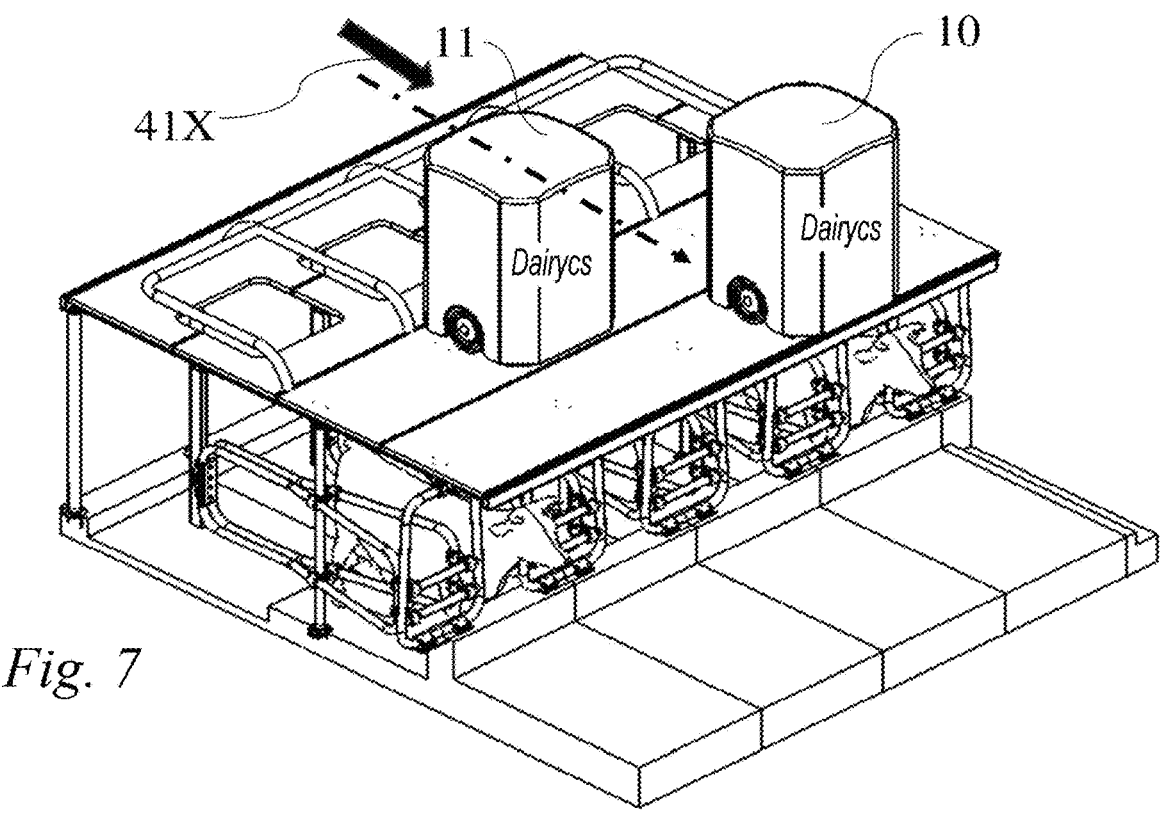
Figure 8:
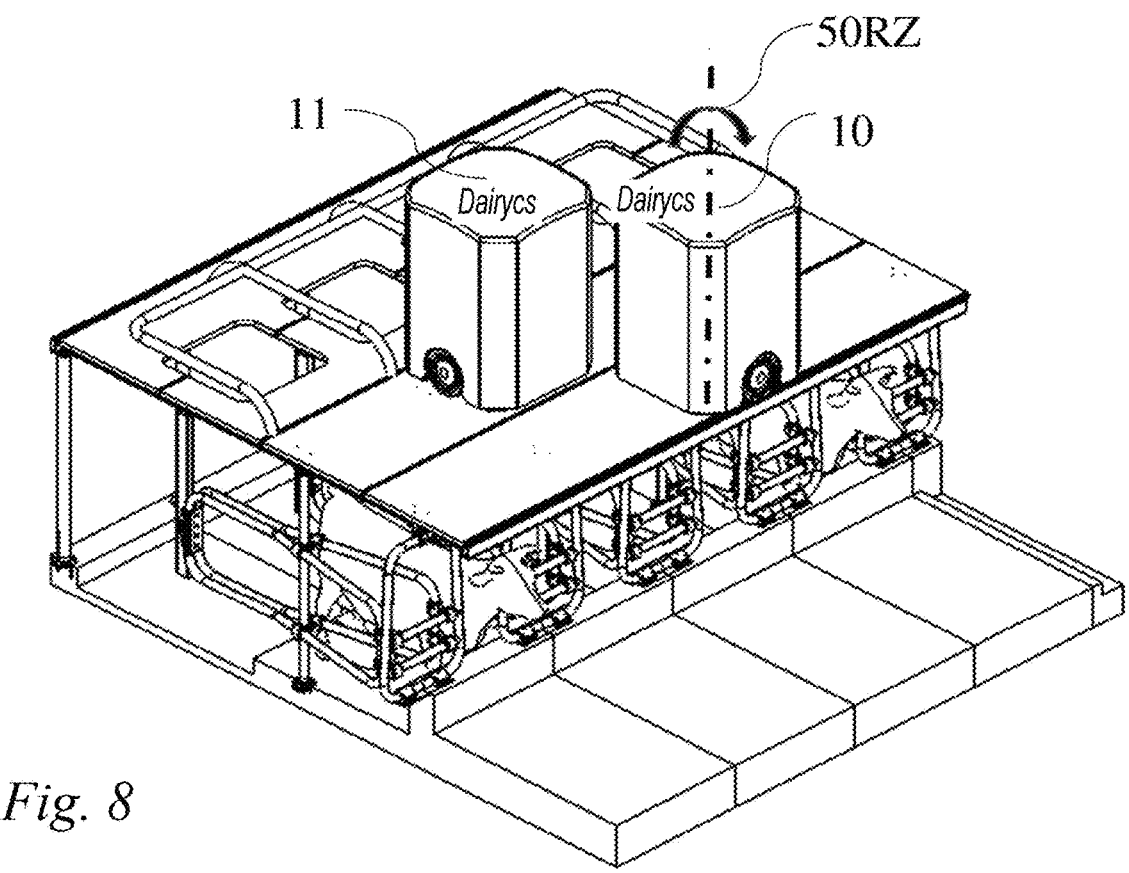
Figure 9:
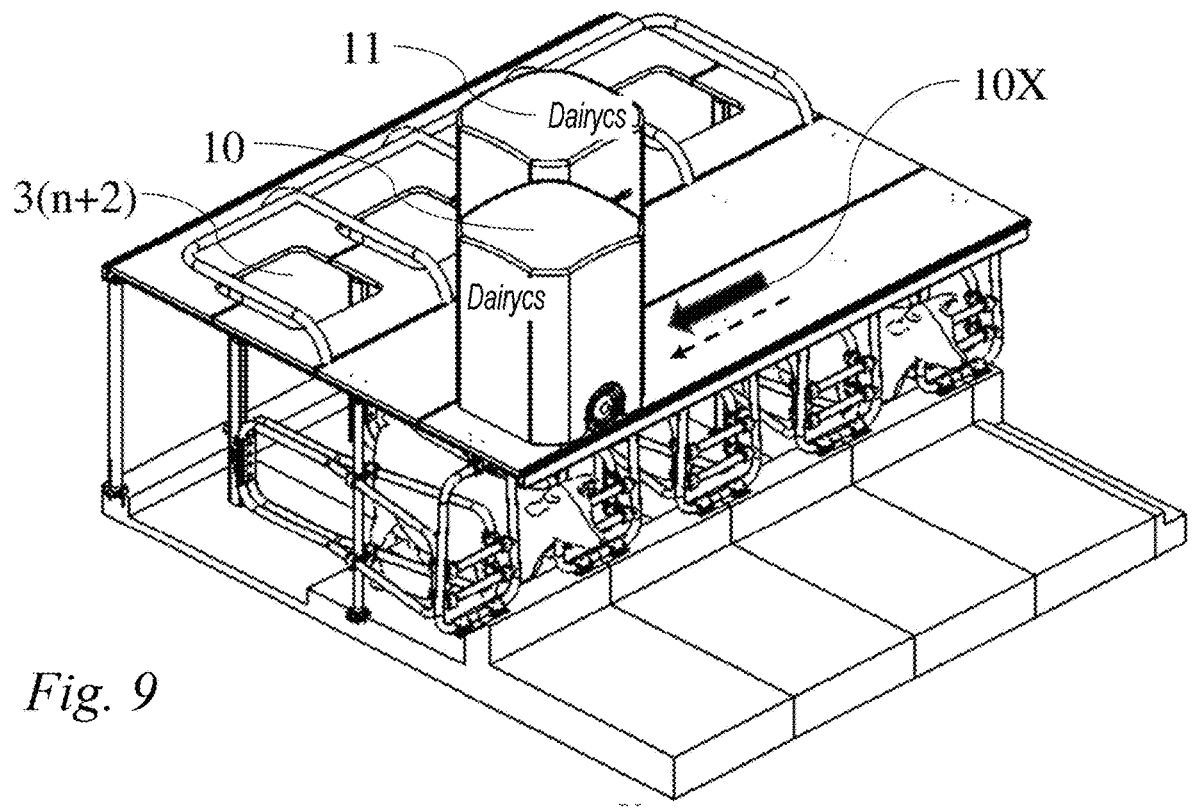
Figure 10:
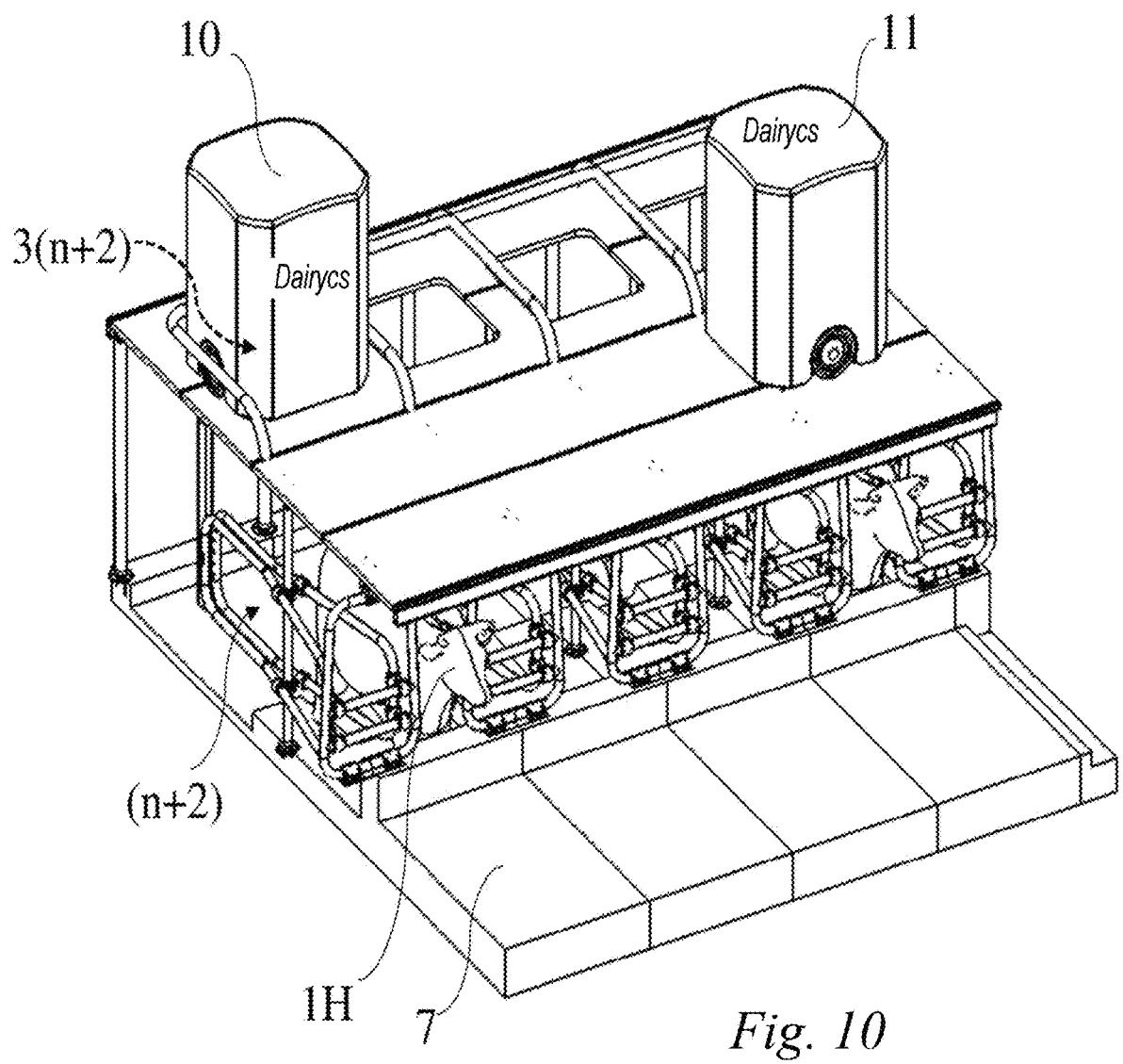

Reference is now made to FIG. 6 showing the continuation of the concurrent independent movement of MMU 10 and MMU 11. MMU 10 now rotates around the Z axis (arrow 30RZ). In a subsequent movement step, as shown in FIG. 7, MMU 10 moves Y-wards (arrow 41X) from the rear lane (2R) to the adjacent front lane (2F). Subsequently, as shown in FIG. 8, MMU 10 now rotates around the Z axis to face the X-axis (arrow 50RZ). Reference is now made to FIG. 9; moving along the 2F lane along the X-axis from (n) to (n+1), MMU 10 passes (10X) MMU 11 that still located at lane 2R/(n+1). Docking station at stall (n+2) is free, and its opening 3(n+2) is ready to accept MMU 10. In a last step, depicted in FIG. 10, MMU 10 travels along the Y axis to its docking station above opening 3(n+2). The cow in stall (n+2), with its head (1H) facing its feed (7), is ready to be milked by MMU 10 or otherwise treated; whilst MMU 11 autonomously leaves the location.

Figure 11:
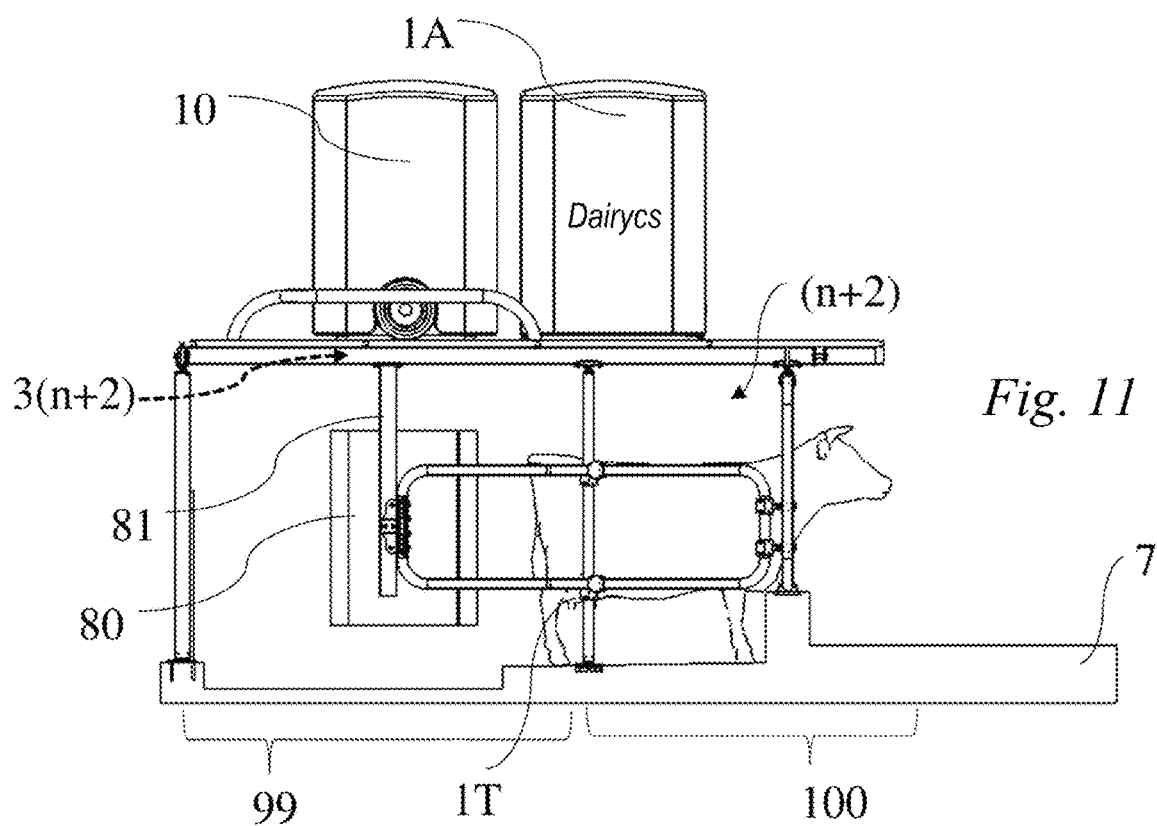
Figure 12:
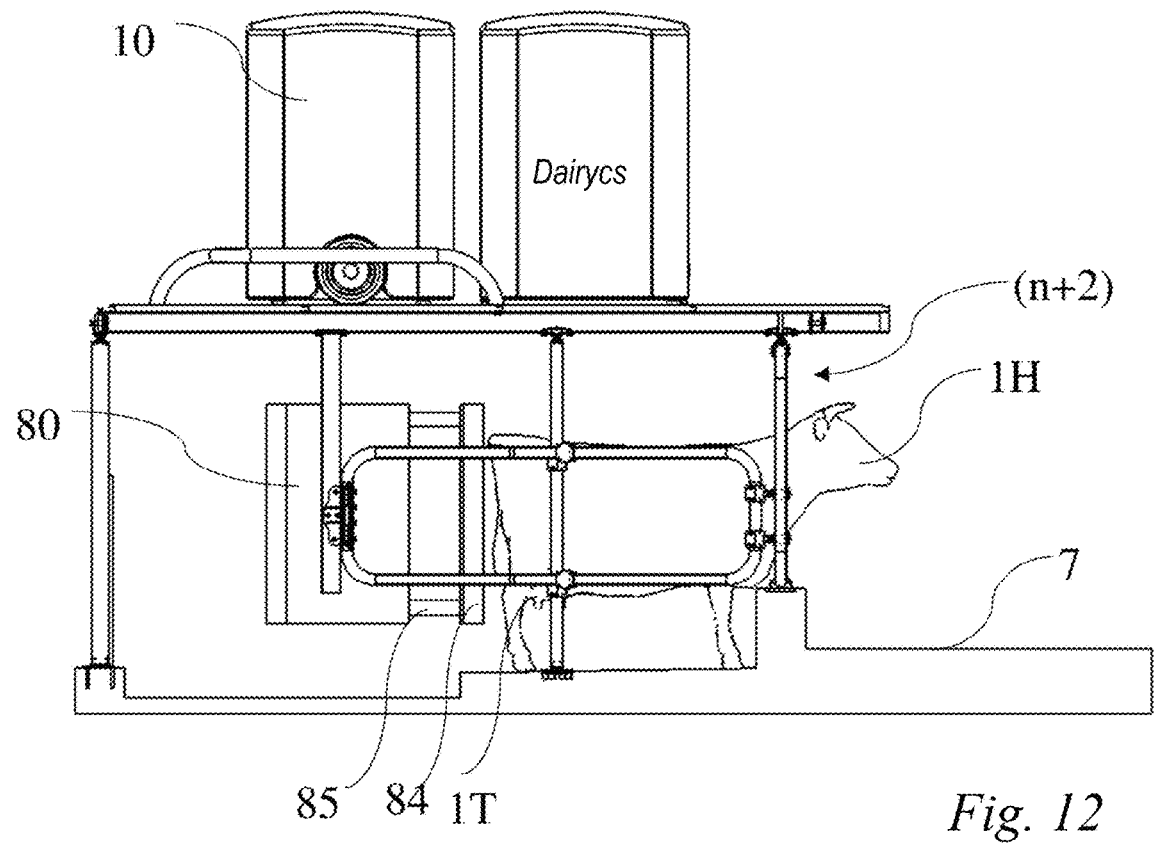

Reference is now made to FIGS. 11 and 12, schematically illustrating a side view of stall (n+2). MMU 10 docks above opening 3(n+2). The opening itself is not shown in this view. MMU 10 comprises or is in connection with a vertical transport mechanism (VTM, see 4a-c in FIG. 13. From MMU 10, a milking module (LMMU, 80) is lowered by utilizing vertical rail(s) (81) or an equivalent thereof, e.g., pneumatic or hydraulic arm(s). At such time as LMMU 80 is in its lower position, an extender 83, movable by horizontal rail(s) (85) or an equivalent thereof, e.g., pneumatic or hydraulic arm(s) approaches the tail (rear) side of the cow (1T). In further step(s), not shown here, another module comprising a plurality of milking units approaches a cow's teats, e.g., by advancing between the cow's rear legs, is milked, the LMMU (10) returns to a position behind the cow and is raised to its upper position, above the cow. This reversible sequence of steps is provided whilst (i) MMU 11 is recharged at the docking station; (ii) MMU 11 leaves the place; and (iii) the cow is concurrently milked/treated and fed from feed's platform 7.

Figure 13:
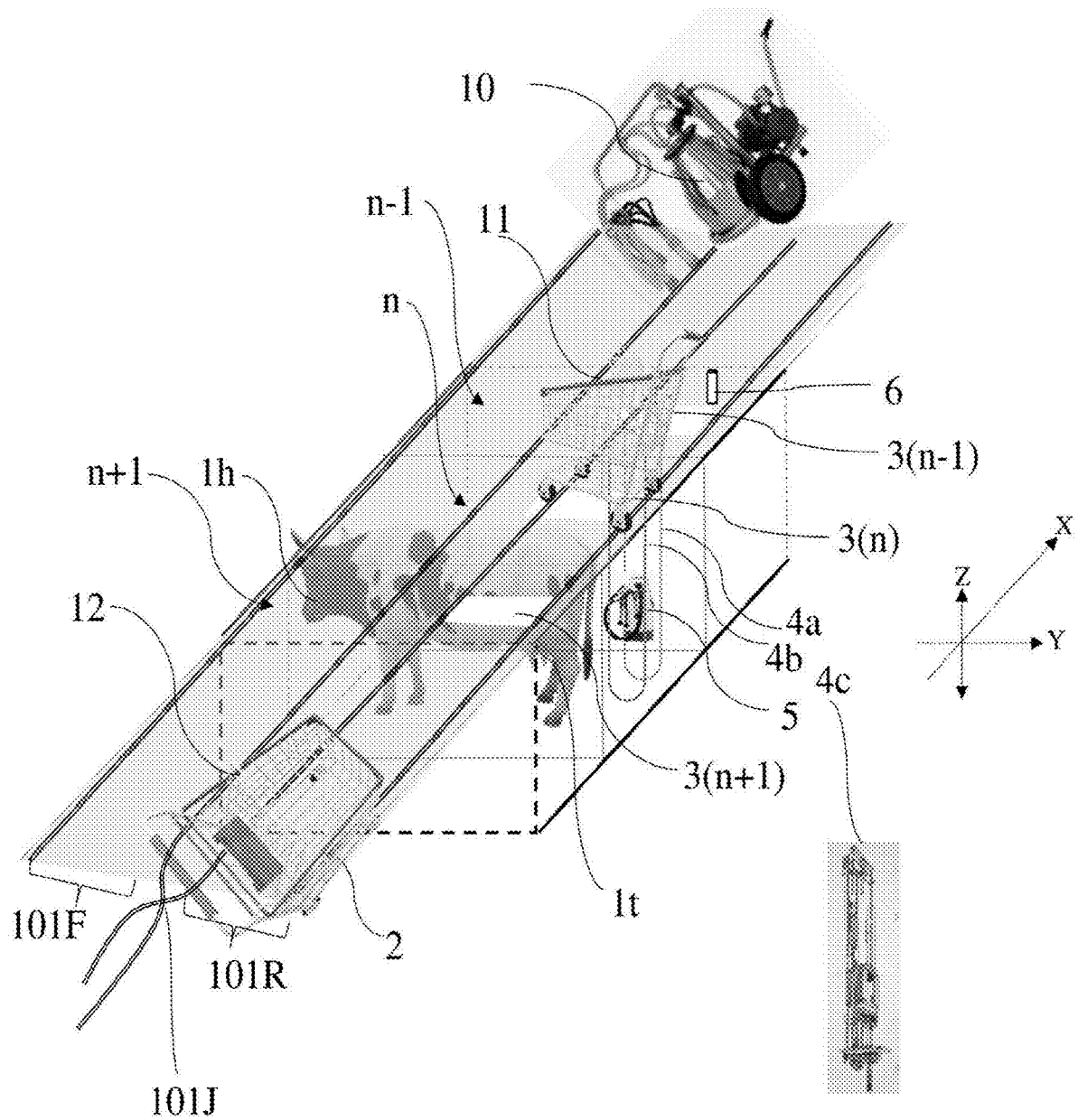
FIG. 13 schematically illustrates a dairy farm with a road surface above the stalls and MMUs thereon according to another embodiment of the invention.

Reference is now made to FIG. 13, schematically illustrates a combination of an elevated rails system, here front rails 101F and rear rails 101R, where those rails may connect in one or more junctions 101J. On this hybrid elevated transportation road 2, two types of movable platforms are concurrently advancing along any combination of the X and Y axes and any rotation thereof: car-like as depicted in MMU 10, and train/trem-like modules as schematically depicted in modules 11 and 12. FIG. 13 also illustrates an optional milking system 4a-4c, comprising e.g., a vertical transport mechanism 4C movable, e.g., on a vertical rail 4a, and connected to a horizontal transfer module 4b, which is configured to reciprocate a milking module comprising a set of teat-suction cups towards the cow teats (1t). As said before, the movement of the milking unit is utilizable from a direction behind the cow, aside the cow, or from any other direction.

In some embodiments of the invention, the milking module and/or sub-modules thereof actuate from the rear portion of the dairy animal (tail side, e.g., between the rear legs) towards the teats.

In other embodiments of the invention, the milking module and/or sub-modules thereof actuate from at least one side of the dairy animal (tail side, 6 o'clock, e.g., between the front and rear left/right legs) towards the teats. The term "side of the dairy animal" refers to a location being lateral to the dairy animal's main longitudinal axis, and includes one or more of the following: (i) rear-and-side (e.g., advancing angles being about 4 or about 8 o'clock, when the tail and head are about 6 and 12 o'clock, respectively); (ii) side, namely adjacent and to the side of the teats at a height lower than the teats, adjacent and to the side of the teats and about the height of the teats, adjacent and to the side of the teats and higher than the teats etc.; at about 3 and 9 o'clock; and side and front, namely at about 2 and about 10 o'clock.

In another embodiment of the invention, the milking module and/or sub-modules thereof actuate from below the dairy animal and/or from above the dairy animal.

In another embodiment of the invention, the milking module and/or sub-modules thereof actuate from a combination of at least one (lateral-) side of the dairy animal, from the rear side, front side, below, above and any combination and orientation thereof.

The present invention also discloses an MMU comprised within, in connection to or otherwise in communication with a milking module, wherein said milking module is configured to approach a dairy animal's teats, in a movement selected from a group consisting of (a) moving, during at least one portion of the whole movement, below the dairy animal, at teat height, at a height of about the middle of the dairy animal, above the dairy animal and any combination thereof; (b), moving, during at least one portion of the whole movement, in a direction selected from a group consisting of toward the dairy animal, away from the dairy animal, along the dairy animal, in the dairy animal's rear portion, in the dairy animal's side (lateral-) portion, in the dairy animal's front portion and any combination and orientation thereof.

The present invention also discloses a milking module comprised within, in connection to or otherwise in communication with an MMU, wherein said milking module is configured to approach a dairy animal's teats, in a movement selected from a group consisting of (a) moving, during at least one portion of the whole movement, below the dairy animal, at teat height, at a height of about the middle of the dairy animal, above the dairy animal and any combination thereof; (b), moving, during at least one portion of the whole movement, in a direction selected from a group consisting of toward the dairy animal, away from the dairy animal, along the dairy animal, in the dairy animal's rear portion, in the dairy animal's side (lateral-) portion, in the dairy animal's front portion and any combination and orientation thereof.

While there have been shown and described and pointed out the fundamental novel features of the invention as applied to a preferred embodiment, it will be understood that various omissions and substitutions and changes in the form and details of the device illustrated, and in its operation, may be made by those skilled in the art, without departing from the spirit of the invention. It is the intention, therefore, to be limited only as indicated by the scope of the following claims.

Another object f the invention is to disclose, in a stall, a gate for limiting the access of a dairy animal to its feed and method thereof Although the present invention was primarily designed for milking cows in its stall, it may be used with other types of stations and objects, and in other fields, as apparent to a person skilled in the art. For this reason, expressions such as "milk", "cow", "stall", "free dome range (FDR, see e.g., WO2018008026)", etc., used herein should not be taken as to limit the scope of the present invention and includes all other kinds of objects or fields with which the present invention could be used and may e.g., active drying process during lactation, cow body scoring, measuring milk yield etc. The term "cow" generally refers here to any animal of relevance, such as horse or pig; and it is specifically referring to a dairy animal, such as cow, and cattle as sheep and goat.

The term "dried cow" refers here to a cow being conditioned for the next lactation. According to an embodiment of the invention, the term refers to such conditioned cow at certain time periods, e.g., the last 50 days before calving. According to an embodiment of the invention, the term refers to such conditioned cow, wherein the free access of the cow to its feed is at least temporarily and at least partially blocked or otherwise limited; and wherein the measure of such blocking or limiting is controllable. Hence for example, along the first period of such drying of the cow the limiting is relatively small, whereas the measure of such limiting along the final period is bigger, namely cow's access is increasingly limited along time.

Furthermore, in the context of the present description, it will be considered that expressions such as "connected" and "connectable", or "mounted" and "mountable", may be interchangeable, in that the present invention also relates to a kit with corresponding components for assembling a resulting fully assembled rotary milking station.

In addition, although the preferred embodiment of the present invention as illustrated in the accompanying drawings may comprise various components, and although the preferred embodiment of the milking station as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperation therein between, as well as other suitable geometrical configurations may be used for the milking station and corresponding components according to the present invention, as will be briefly explained hereinafter and as can be easily inferred herefrom by a person skilled in the art, without departing from the scope of the invention.

Broadly described, the present invention, as illustrated in the accompanying drawings, relates to a milking station to be used for milking cows and the like, as is well known in the art. The present milking station may be used for milking various other types of animals. The present milking station is preferably of simple design and inexpensive to manufacture. As will be shown hereinbelow, the present milking station possesses several advantages when compared to conventional milking stations known in the art.

Moreover, and as can be easily understood by a person skilled in the art, in view of the accompanying drawings, the milking station according to a preferred embodiment of the present invention is intended to be used as a working station for treating, or "milking" animals, typically milking cows, such as is known in the field of dairy farms and the like.

The present invention discloses, in a stall, a gate located between the animal and the feeding line thereby configured to at least temporarily prevent or otherwise limit free access of the animal to its feed. The term "gate" interchangeably refers here a door, window, window blinds having both at least one open configuration and least one closed configuration, and to any flexible, semi-rigid or rigid barrier, being a continuous (intact) member or at least partially perforated member. The term also refers to either smooth or at last partially textured curtain, blind, screen, shutter, net, perforated member comprising aperture, holes or wires. The term also refers to a homogeneously-constructed member or heterogeneous one, namely a gate comprising a frame portion and a barrier portion interconnecting the frame portions. The term also refers to mechanically operated gates, electrically operated gates, hydraulically or pneumatically operated gates, commuter-operated or controlled gates, gates that are open or closed after animal's identification, having a certain specification, animal/process verification, authorization and authentication. The term is also referring to gates having electrical or acoustical means, such that animal is avoiding to pass the gate is at least partially provided due to operation of electrical low/short currents or acoustical signal, such as noise, barking-like or human-like messages etc.

Figure 14:
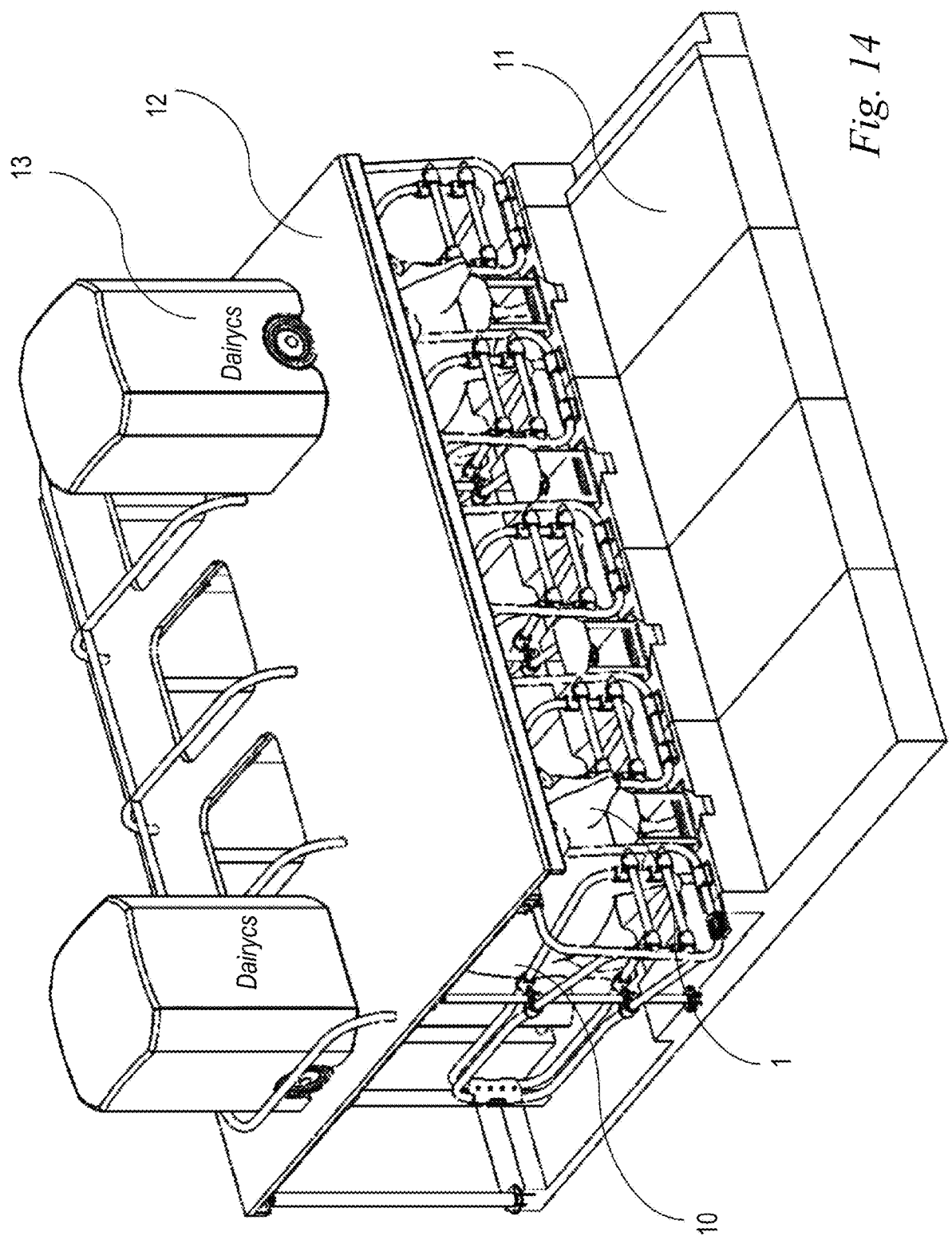
FIG. 14 schematically illustrates an FDR where gates of the present invention are utilizable according to one embodiment of the invention.

FIG. 14 discloses an array of stalls (10) of dairy cows (1), here exempli gratia in a non-limiting manner are illustrated a line of parallel stalls provided in an FDR as defined in WO2018008026, IL268278 and IL271314, all are incorporated herein a reference. Each of the diary animals (1) is accommodated is an elongated stall, head facing a feeding line (11) ("front"). In this FDR, animals are at ground level, and mobile milking units (13) are movable at upper level (12). It is well in the scope of the invention that all types of dairy farming are provided useful for utilizing a gate as hereto presented (e.g., robotic farms, milking institutes etc.), and not only an FDR system which is provided here in a non-limiting manner as an example.

Figure 15:
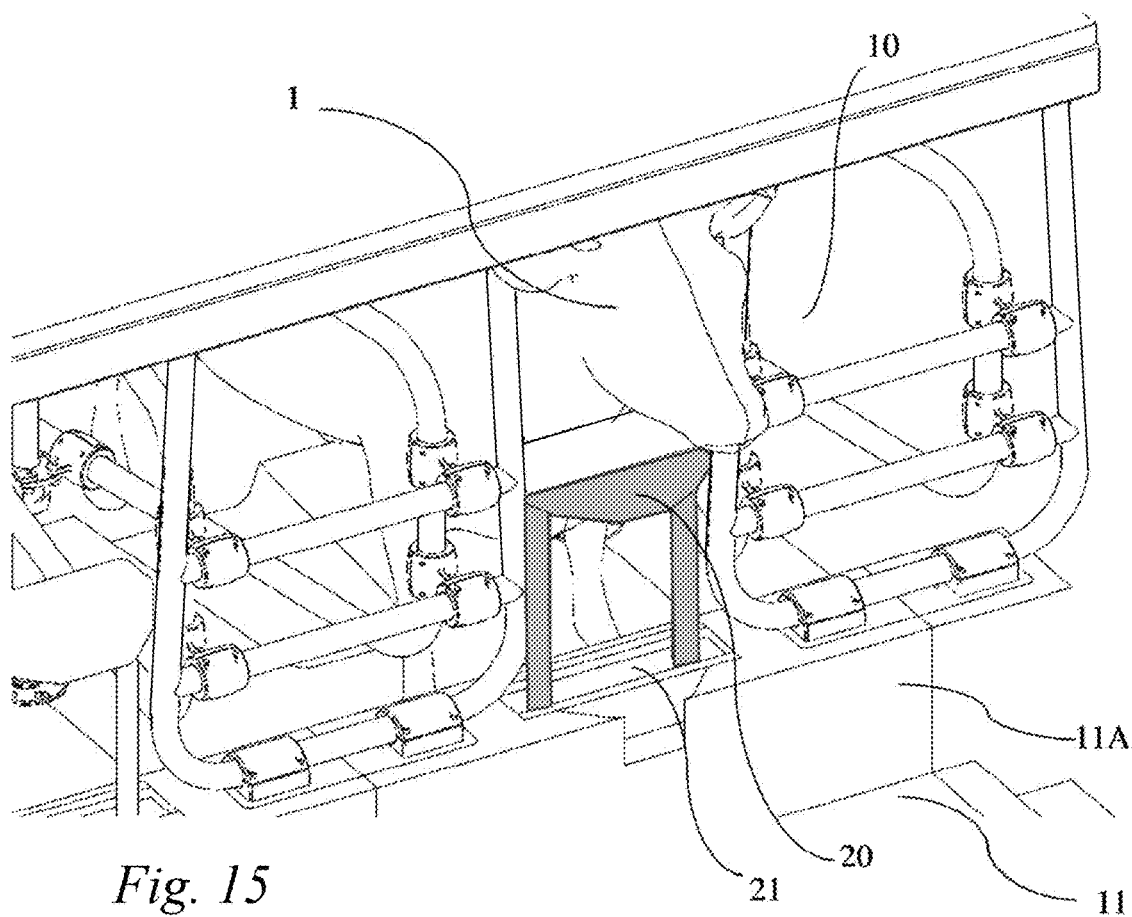
FIGS. 15 to 22 schematically illustrate stalls with gates of the present invention according to yet other embodiments of the invention.
Figure 16:
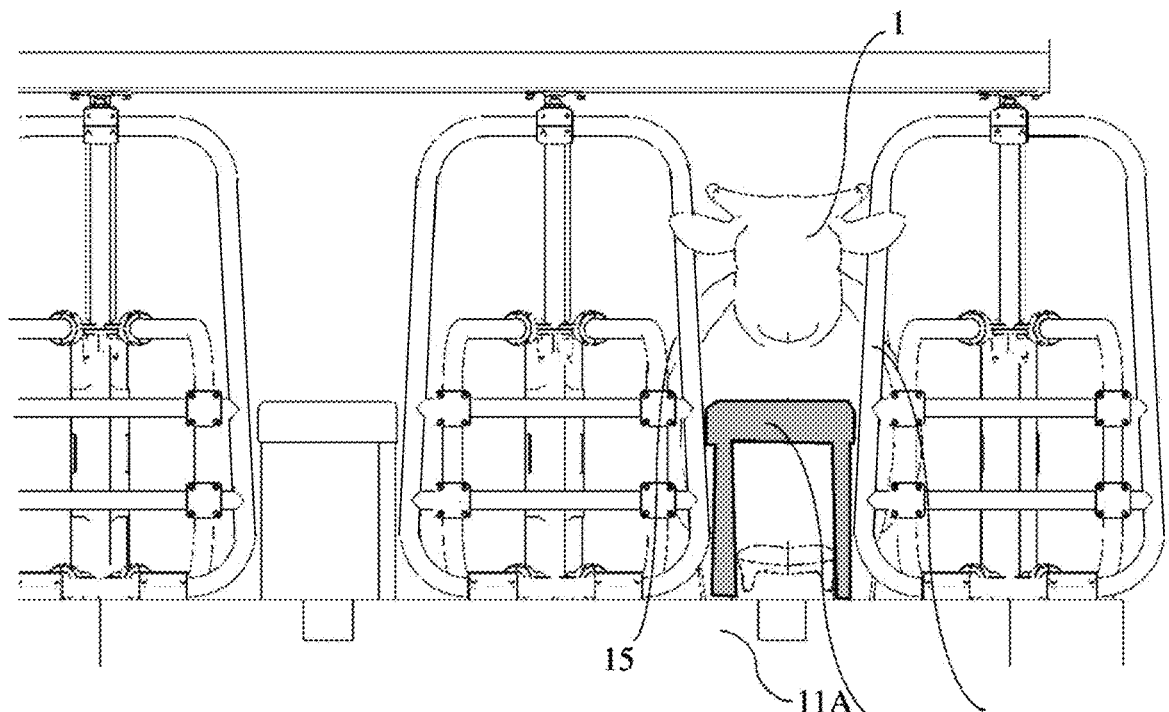
Figure 17A:
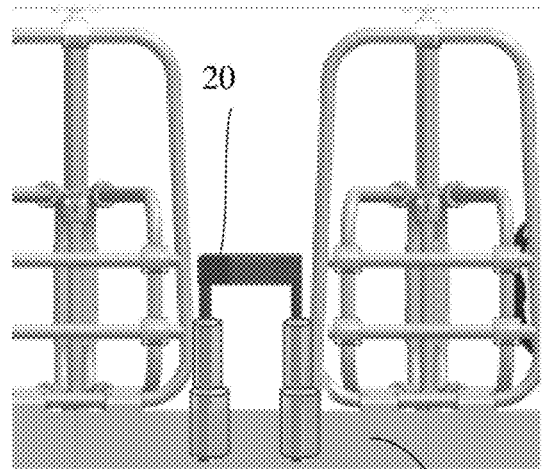
Figure 17B:
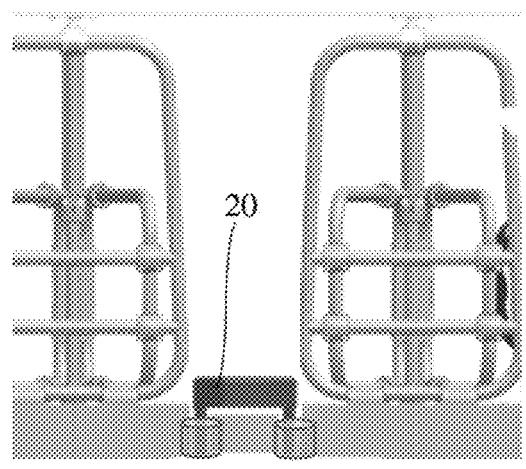

FIGS. 5 to 22C, schematically illustrating in an out of scale manner a portion of the aforesaid FDR. Reference is now made to FIG. 15 that depicts a top and right view of a cow (1) accommodated in its stall (10), head facing the feeding line 11. A linearly reciprocating barrier (20) is affixed at the front portion of the stall, namely at frontal wall 11A. An accepting aperture 21 is provided within wall 11A configured by means of shape and size to accept barrier 20 when lowered down. FIG. 3 is showing a front view of the same. Cow 1 is directed forwardly, facing feeding-line wall 11A, and barriered by means of side fences 14 and 15, and frontal barrier 20. Reference is now made to FIG. 4A and FIG. 4B, schematically illustrating an embodiment of the invention, wherein the barrier (20) is linearly reciprocated from a closed configuration to an open configuration by means of a hydraulic or pneumatic telescopic gate shutting module (GSM). This type of GSM is reversibly switching barrier 20 from an "open configuration" to a "close configuration" and vice versa.

It is well in the scope of the invention wherein the GSM is operated in one or more mechanisms selected from one or more of the following: mechanical (e.g., by means of using rotating screws, or snails, springs etc.) electrical, manual, semi-automatic, automatic, hydraulic, pneumatic, and a combination thereof.

It is well in the scope of the invention wherein the term "gate" refers here to any barrier located between the animal and the feeding line thereby configured to at least temporarily prevent or otherwise limit free access of said animal to its feed. This term interchangeably refers to one or more members of a group consisting of barrier(s), fence(s), movable obstacle(s), hurdle(s), curtain(s), net(s), pivot(s), lever (s), pole(s), door(s), block(s), wire(s) such as electric wire(s) and any combination thereof.

When a plurality of side-to-side or otherwise adjacent stalls are used, it is in the scope of the invention wherein one specific gate is operated (namely open or closed) thereby access of one specific cow to its food is denied. It is also in the scope of the invention wherein more than one gate, e.g., two, six or all gates are simultaneously operated at substantially same time, i.e., in a time interval of a few seconds.

Figure 18A:
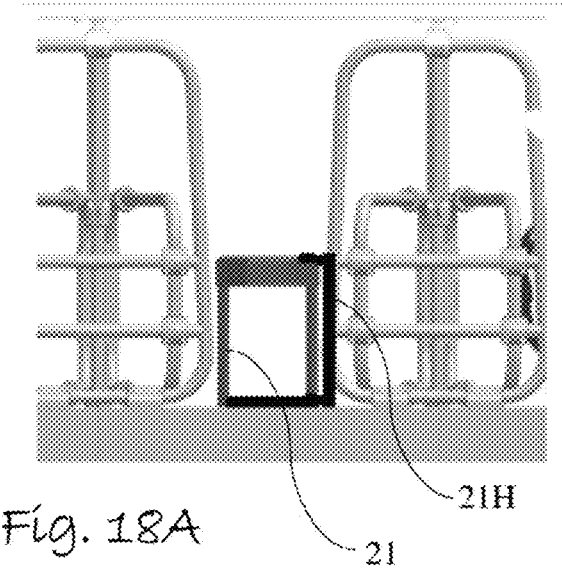
Figure 18B:
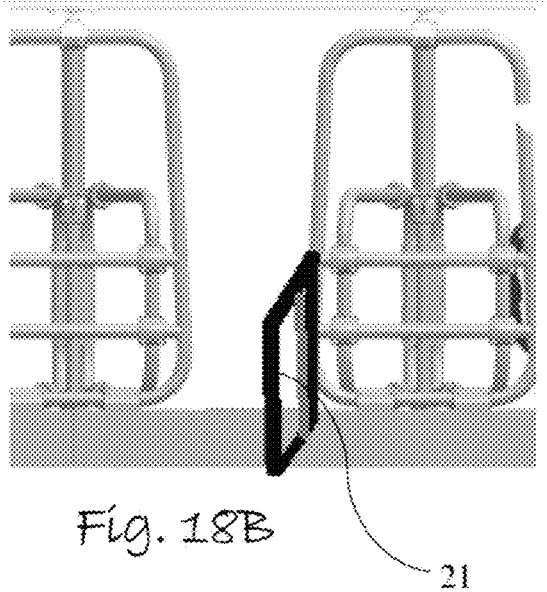
Figures 19A, 19B:
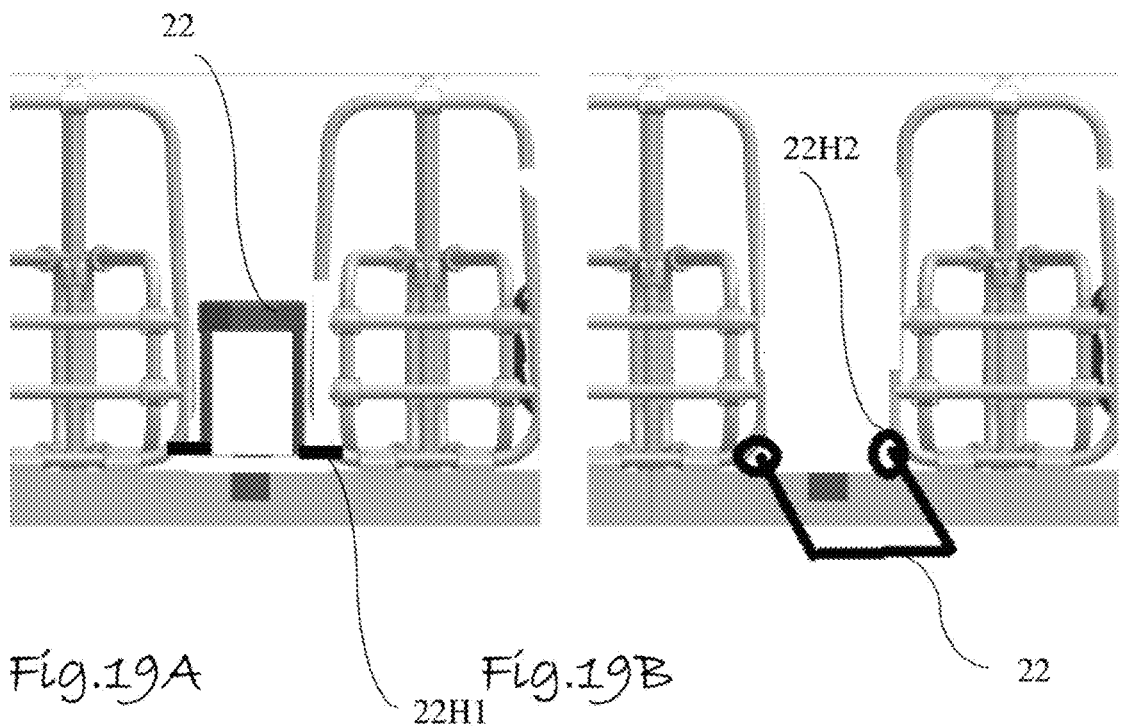

Reference is now made to FIGS. 18A and 18B, illustrating a swiveling door-like gate (21) having an erected (vertical) hinge (21H). In FIGS. 19A and 19B, a horizontal hinge being parallel to frontal end main axis is utilized (FIG. 19A, 22H1) whereas other type of horizontal hinge being perpendicular to frontal end main axis is utilized (FIG. 19B, 22H2) is used.

Figure 20:
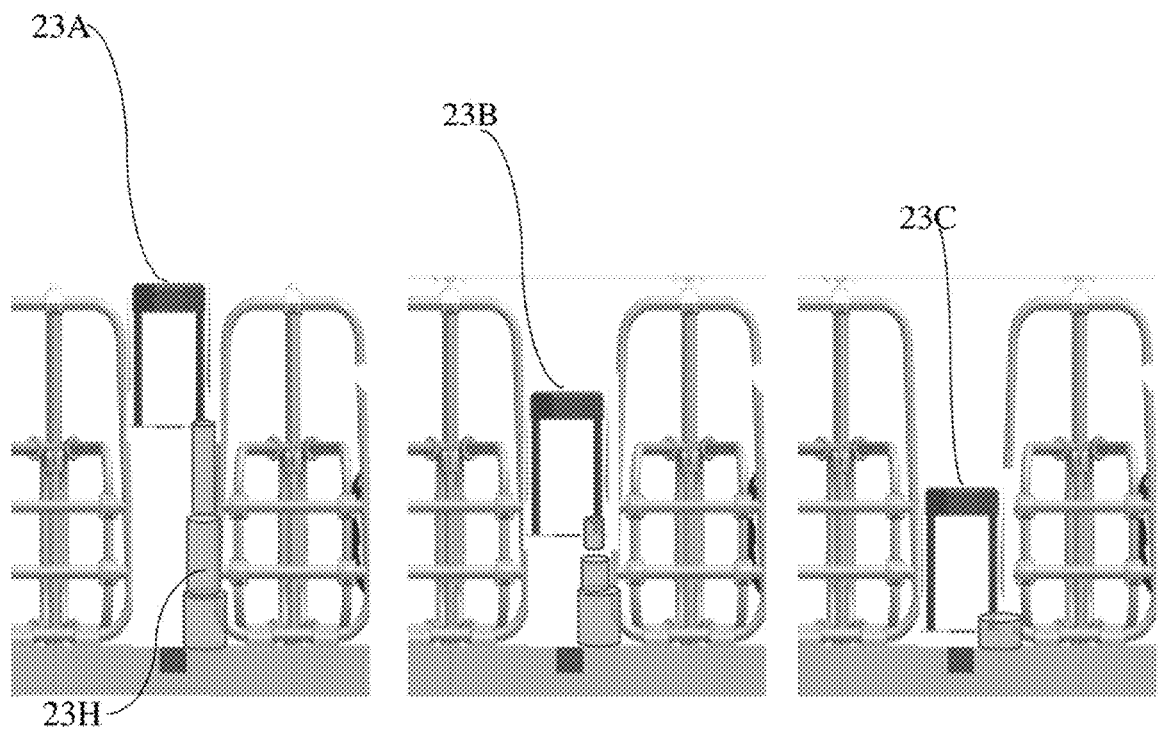

Reference is now made to FIG. 20, showing, much schematically, a window-like vertically and upwardly movable gate in its open configuration (23A), semi-closed configuration (23B) and closed configuration (23C).

Figure 21:
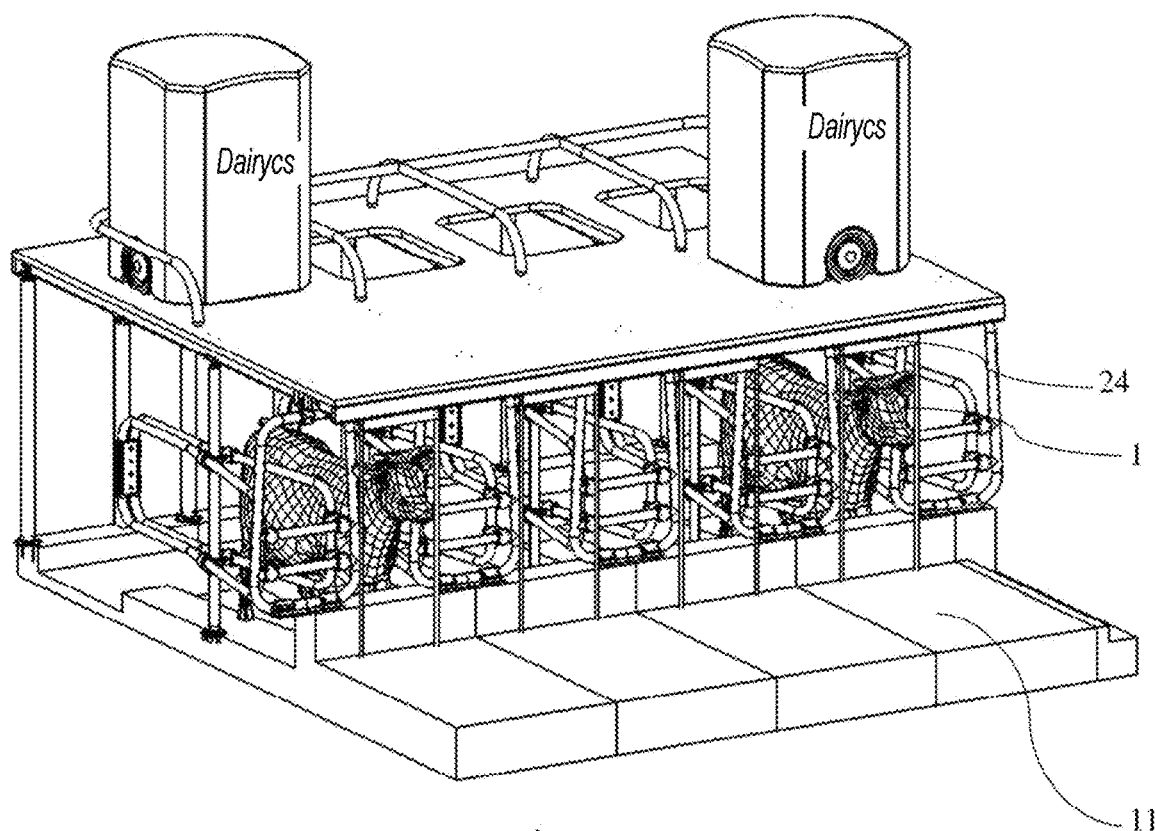
Figure 22A:
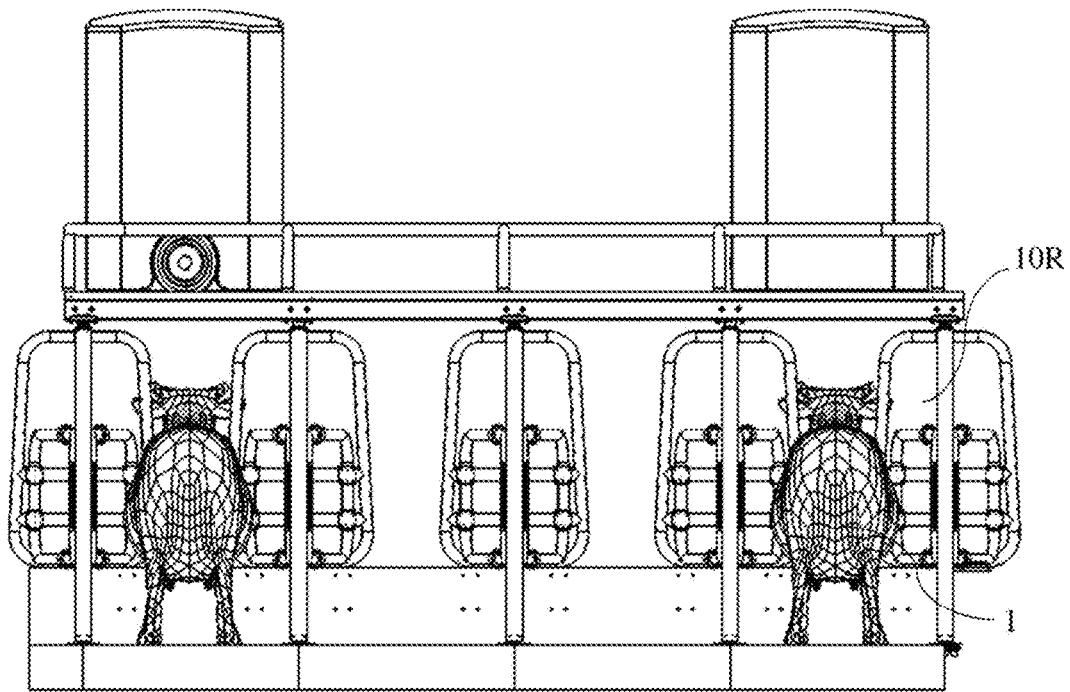
Figure 22B:
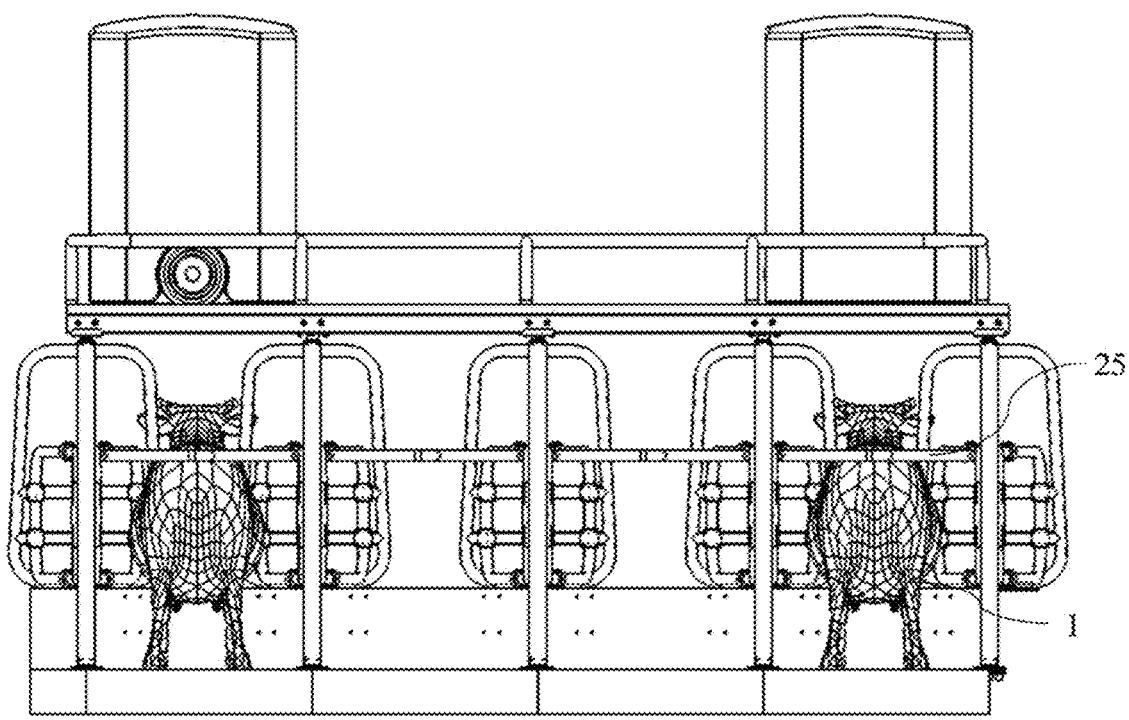
Figure 22C:
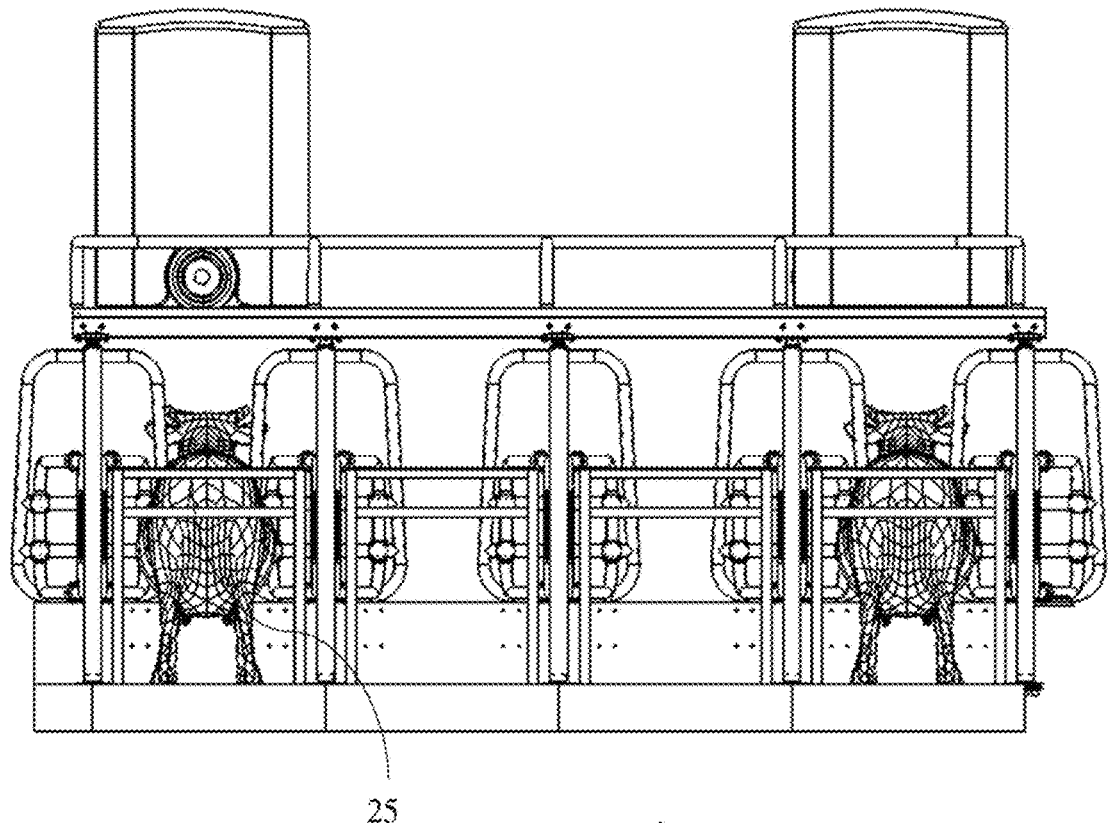

FIG. 21 much similarly depicts a curtain-like gate (24) in its upper open configuration and shut (closed-) configuration, respectively. When shut closed (here shown only ion its open configuration), curtain 24 selectively avoids cow 1 in stall 11, or collectively (namely closed to two or more cows in their stalls) from an access to its food laying on feeding line 11. As front side of stall 11 is blocked by gate 24, the rear exit (10R) is either open or blocked. Reference is hence made to FIGS. 22A, 22B and 22C showing the rear portion of the stall (10R), where cow 1 is free to leave the stall, or otherwise it blocked by means of GSM having a single barrier (25) or multiple barriers, respectively.

The figures above, e.g., FIGS. 22A, 22B and 22C, discloses means to provide a method of at least temporarily preventing or otherwise limiting free access of an animal to its feed, comprising step of providing a gate and locating it between said animal and the feeding line. This method of at least temporarily preventing or otherwise limiting free access of a dried dairy animal to its feed, comprising step of providing a gate and locating it between said animal and the feeding line. The figures also provide method as defined above to be useful when it comprising step of identifying said dairy animal as a dried animal. The method may further comprise step of, upon identifying said dairy animal (e.g., by means of tag or biometric features by a reader in or near the stall) as a dried or otherwise nutritionally-different animal (e.g., animal required different nutrition program), closing the gate or otherwise let the gate rest in its close configuration. The method may further comprise step of, upon identifying dairy animal as a dried animal, intercommunicating with a computerized operator, and then, upon verification of said specific animal updated feeding program, closing said gate or otherwise let the gate rest in its close configuration.

It is well in the scope of the invention wherein the mechanism and methods thereof to open the gate is moving it forward or forward or upwards and/or back, e.g., in a parallelogram-like gate. Such a mechanism enables a gentle opening and closing by lightly pushing cow's head backwards when time is come to stop eating.

It is well in the scope of the invention wherein the mechanism and methods thereof to open the gate is moving it forward or forward/upwards and back, like a parallelogram, yet not by rotating or sliding. Such gentle opening and closing movements are provided when cow's head is pushed backwards when time is come for the cow to stop eating.

Although preferred embodiments of the present invention have been briefly described herein and illustrated in the accompanying drawings, it is to be understood that the invention is not limited to these embodiments and that various changes and modifications could be made without departing form the scope and spirit of the present invention, as defined in the appended claims.

The invention claimed is:

1. A free dome range system (FDR) comprising both:
at least one front elevated rail (FER);
at least one rear elevated rail (RER); and
a plurality of mobile units (MMUs), each of said plurality of mobile units movable along a member of a group consisting of: said at least one FER, said least one RER and any combination thereof.

2. The FDR of claim 1, wherein said FDR comprises a plurality of FERs and/or a plurality of RERs.

3. The FDR of claim 1, wherein said at least one mobile unit is selected from a group consisting of a taxi, a mobile milking unit (MMU); a mobile feeding unit (MFU); a mobile cooling unit (MCU); a mobile milk-transferring unit (MTU); a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof.

4. The FDR of claim 1, wherein at least one of said plurality of mobile units is movable independently of movement of all other of said plurality of mobile units; and/or wherein movement of at least one of said plurality of mobile units is interrelated with movement of at least one other of said plurality of mobile units.

5. The FDR of claim 1, wherein said FER is located at a front portion of at least one cow stall, and wherein said FDR comprises two or more FERs.

6. The FDR of claim 1, additionally comprising at least one rear elevated rail (RER) located at a rear portion of at least one cow stall so that at least one mobile unit is movable along said at least one RER manually, semi-automatically, automatically, robotically, by means of an AI-activated computer system and any combination thereof.

7. The FDR of claim 1, wherein a member of a group consisting of said FER, said at least one RER and any combination thereof is configured to be perpendicular to a line of stalls.

8. The FDR of claim 1, wherein said at least one mobile unit is selected from a group consisting of a taxi, a mobile milking unit (MMU); a mobile feeding unit (MFU); a mobile cooling unit (MCU); a mobile milk-transferring unit (MTU); a stall cleaning unit, an animal cleaning unit, an animal measuring unit, an animal identifying unit, a tag-free identification unit, an animal health-scoring unit, an animal documenting unit, an animal to stall matching unit, an animal-to-milking group matching unit, an animal feed analysis unit, a cow health unit, a feed intake unit, an estrus diagnosing unit, an alerting unit, a feed pushing unit, a feed remixing unit, a feed compressing unit, a feed compacting unit, a refreshing or spreading unit, a feed autoloading unit, a food preparation unit; and any combination thereof; movement of at least one of said plurality of mobile units is either independent of movement of all others of said plurality of mobile units, or interrelated with movement of at least one other of said plurality of mobile units.

9. In a free dome range system (FDR), at least two front elevated rails (FERs) along which at least two mobile unit is movable.

10. A dairy farm characterized by
(a) an array of n stalls (n−1, n, n+1, n+2) side-by-side on a dairy animal (low-) level; each of said stalls is configured by means of size and shape to accommodate a dairy animal (1), and having a main longitudinal axis Y, a front (feeding-) side (head side, 1$h$) and an opposite rear (milking-) side (tail side, 1$t$) along said Y axis; and
(b) a common elevated road surface (2) provided on a higher level, above said stalls; said road surface extends along an axis X which is substantially perpendicular to said axis Y, and configured to allow free passage of at least one mobile unit, including at least one mobile milking unit (MMU, 10) in a direction selected from a group consisting of: along said X axis, along said Y axis, a rotation about the X axis, a rotation about the Y axis, a rotation about the Z axis, and any combination thereof.

11. The dairy farm of claim 10, wherein said road surface (2) comprises one or more openings (3$n$) enabling free connection along the vertical Z axis between an upper surface of said road surface and said stall beneath.

12. The dairy farm of claim 11, wherein each of said n stalls (n−1, n, n+1, n+2), at its rear portion, comprises an opening 3($n$−1), 3($n$), 3($n$+1), 3($n$+2), respectively.

13. The dairy farm of claim 12, wherein said rear portion is located in an area selected from a group consisting of: behind said dairy animal teats (1$t$); beside said dairy animal teats (1$t$); in front of said dairy animal teats (1$t$) and any combination thereof.

14. The dairy farm of claim 11, wherein at least one vertical transport mechanism (VTM, 4$a$-$c$) is located adjacent each of said opening.

15. The dairy farm of claim 10, wherein said mobile-unit docking station (6) is provided adjacent to at least one said opening; said docking station comprising means to service said at least one MMU, said service is selected from a group consisting of providing energy, providing steam, providing at least one fluid, removing at least one fluid, and removing milk.

16. The dairy farm of claim 10, wherein said MMU comprises, is in connection with or is in communication with a milking module configured to advance towards the dairy animal's teats, in a movement provided in a manner selected from a group consisting of
(a) moving, during at least one portion of the whole movement, below the dairy animal, at teat height, at a height of about the middle of the dairy animal, above the dairy animal and any combination thereof,
(b), moving, during at least one portion of the whole movement, in a direction selected from a group consisting of toward the dairy animal, away from the dairy animal, along the dairy animal, in the dairy animal's rear portion, in the dairy animal's side (lateral-) portion, in the dairy animal's front portion and any combination and orientation thereof.

17. The dairy farm of claim 10, wherein said elevated road comprises a freeway for the transport of MMU and at least one rail system.

18. In a dairy farm of claim 10, an MMU (10) comprising an automated (autonomous) driving system for transporting along said road surface (2) in a direction along said X axis, along said Y axis, a rotation about the X axis, a rotation about the Y axis, a rotation about the Z axis, and any combination thereof.

19. The MMU of claim 18, further comprising a docking mechanism configured to perform at least one of loading services from a docking station (6) and unloading at least one service from said docking station (6), said service is selected from a group consisting of providing energy, providing steam, providing at least one fluid, removing at least one fluid, and removing milk.

20. The MMU of claim 18, further comprising a vertical transport mechanism (VTM, 4*a-c*).

* * * * *